Nov. 26, 1935. B. W. HAMMER ET AL 2,022,420
PROCESS FOR TREATING LACTIC FLUIDS
Original Filed March 26, 1935  10 Sheets-Sheet 1
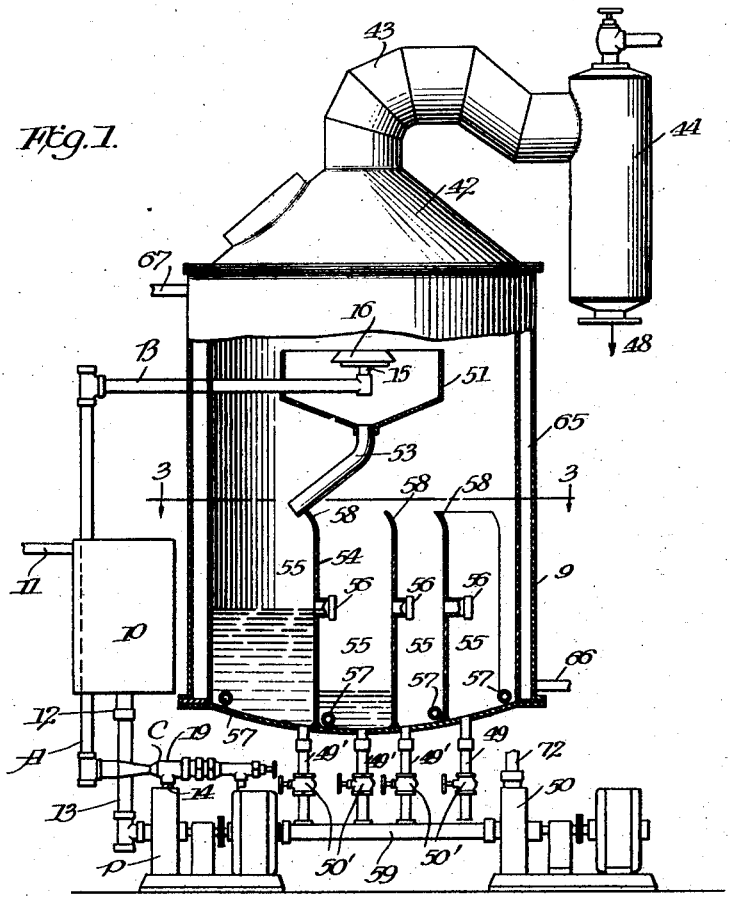
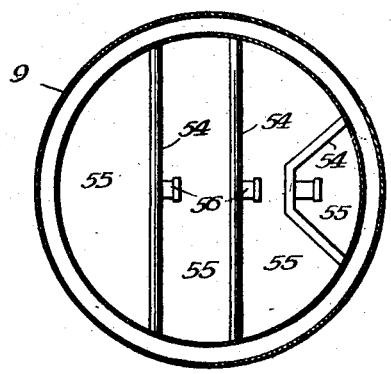
Inventors
Bernard W. Hammer,
Herman C. Horneman,
Milton E. Parker,
Cushman Darby & Cushman Attorneys

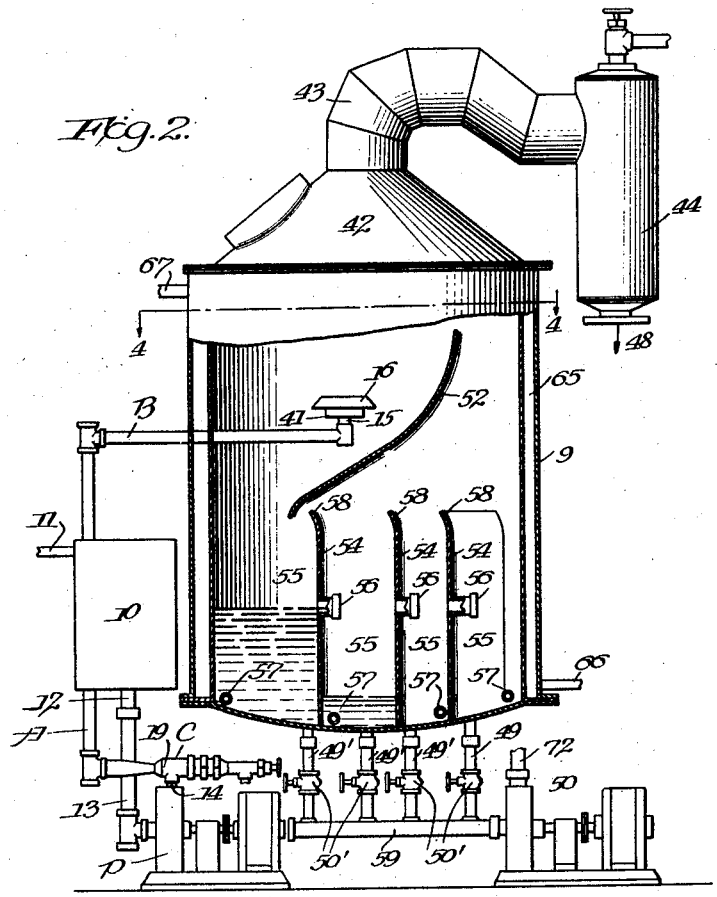
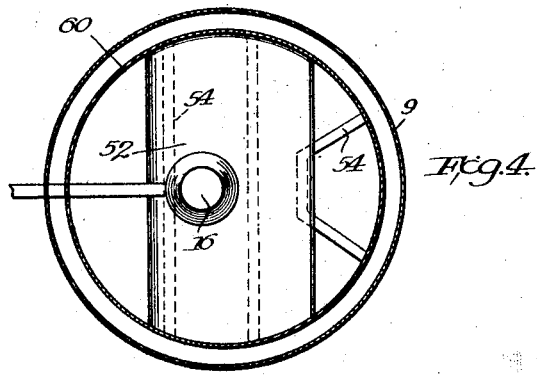

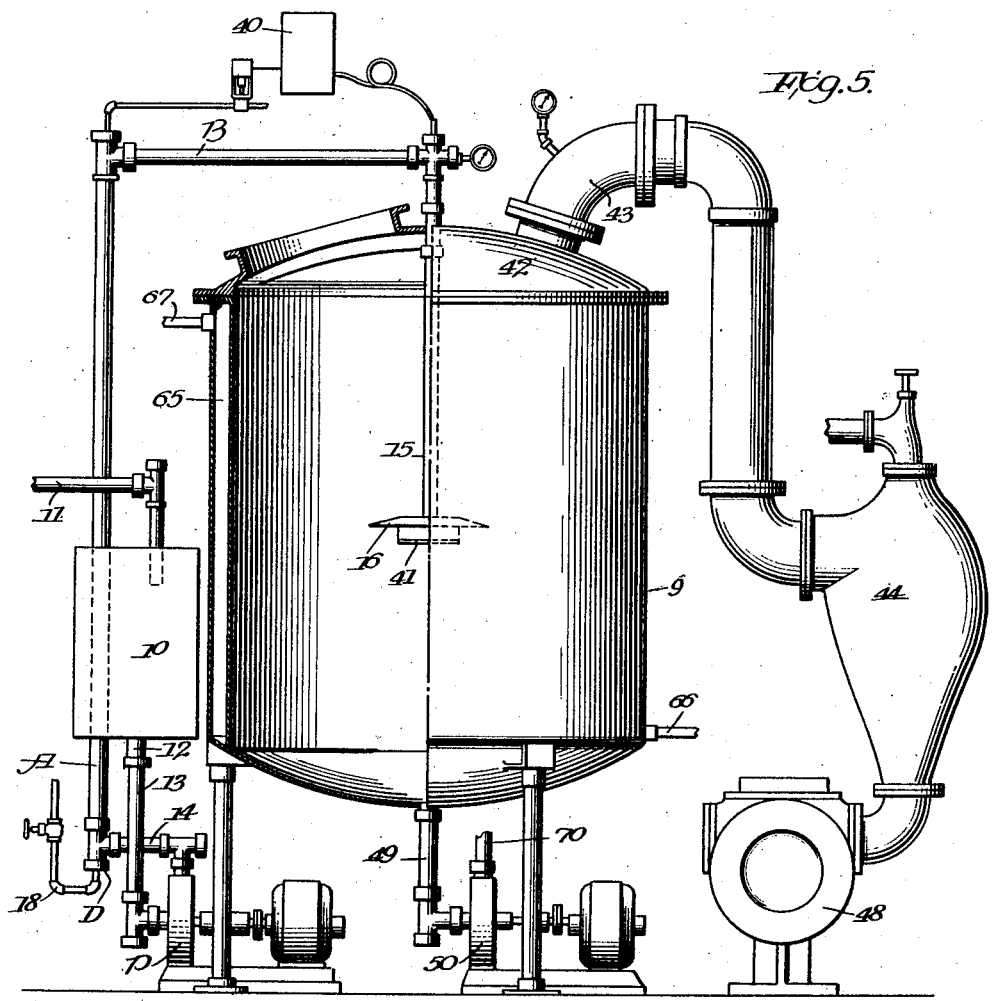
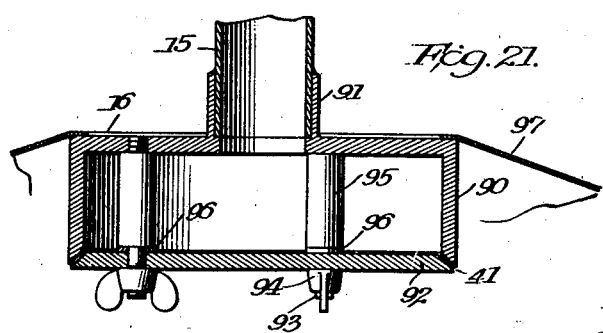

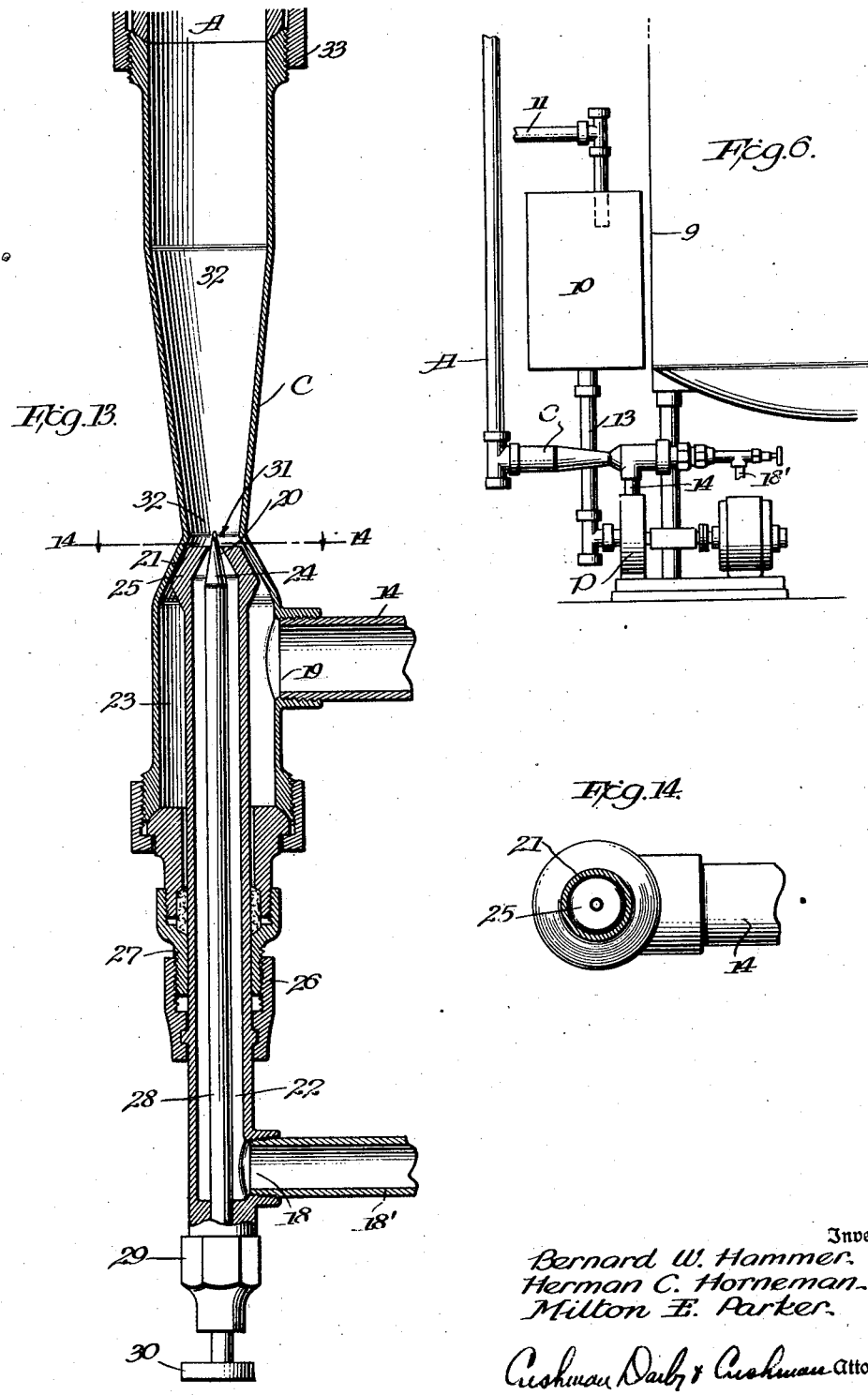

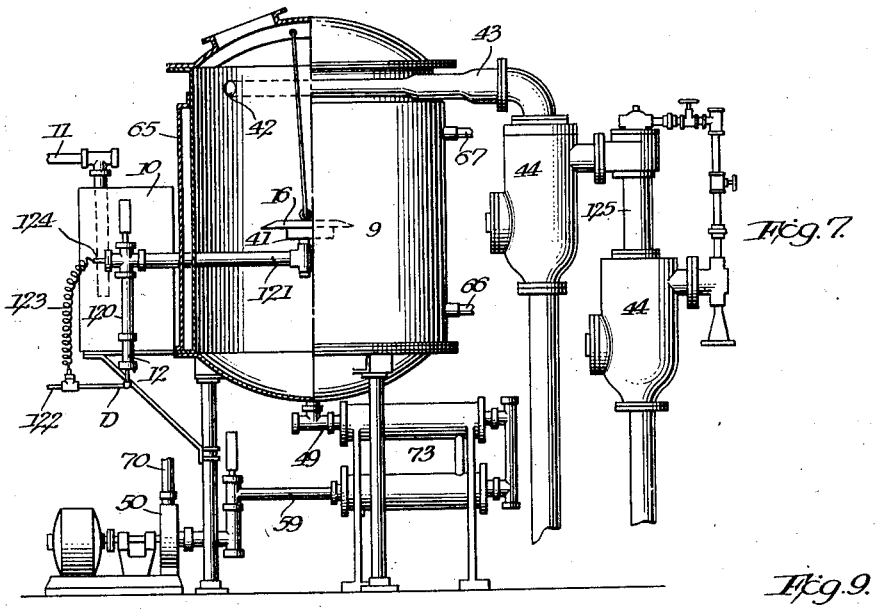
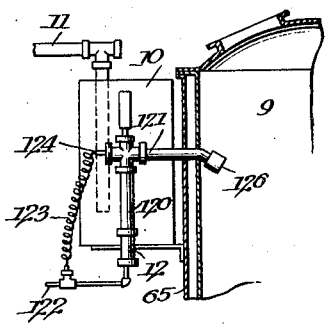
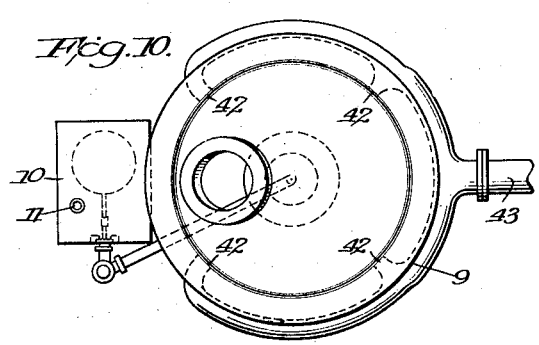
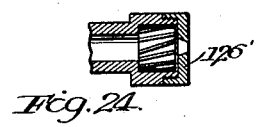
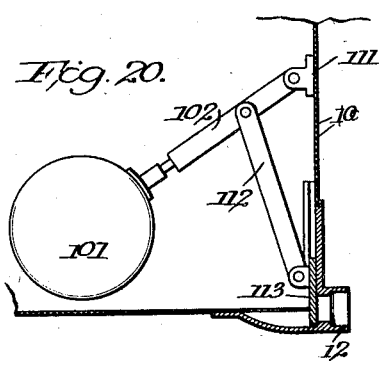

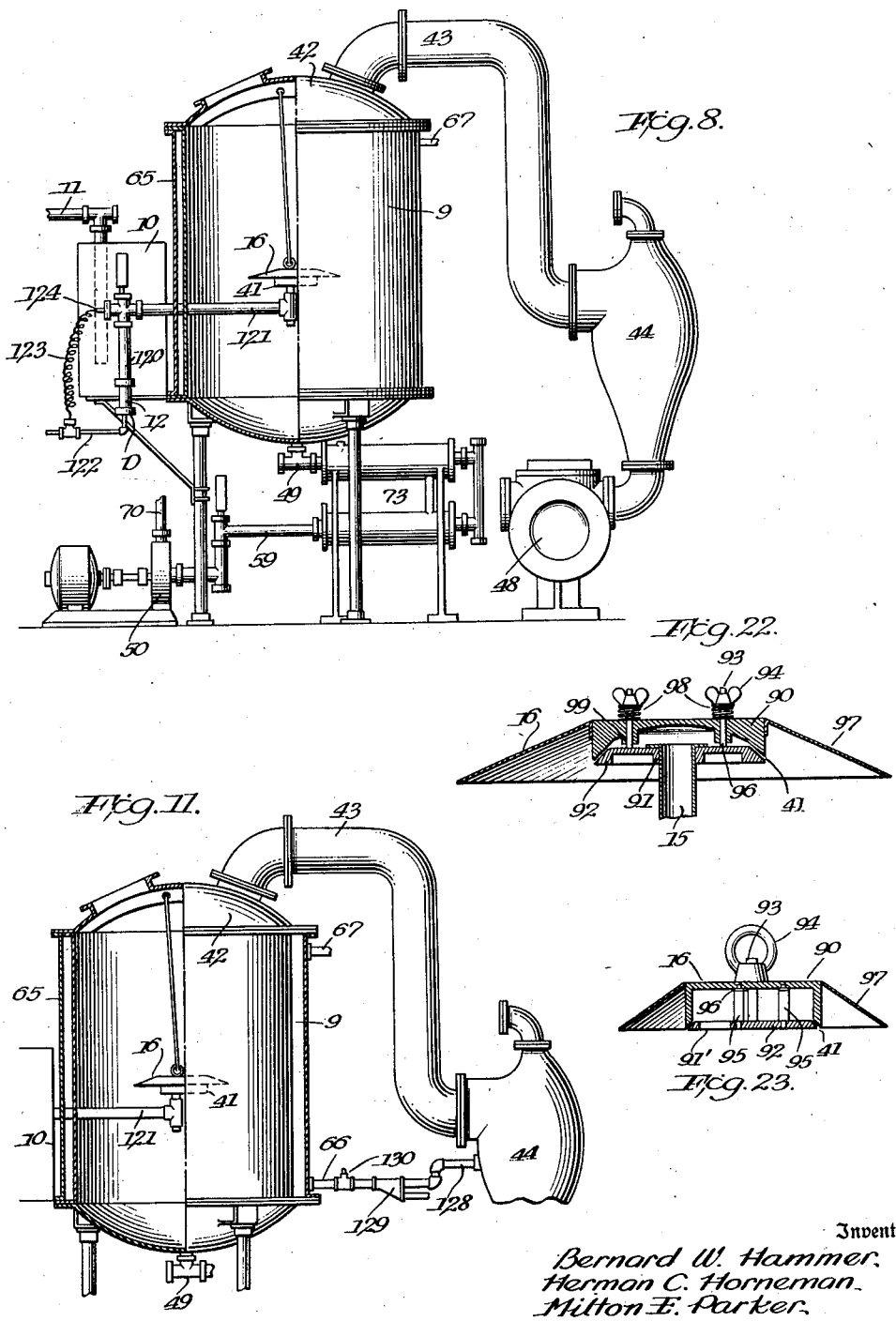

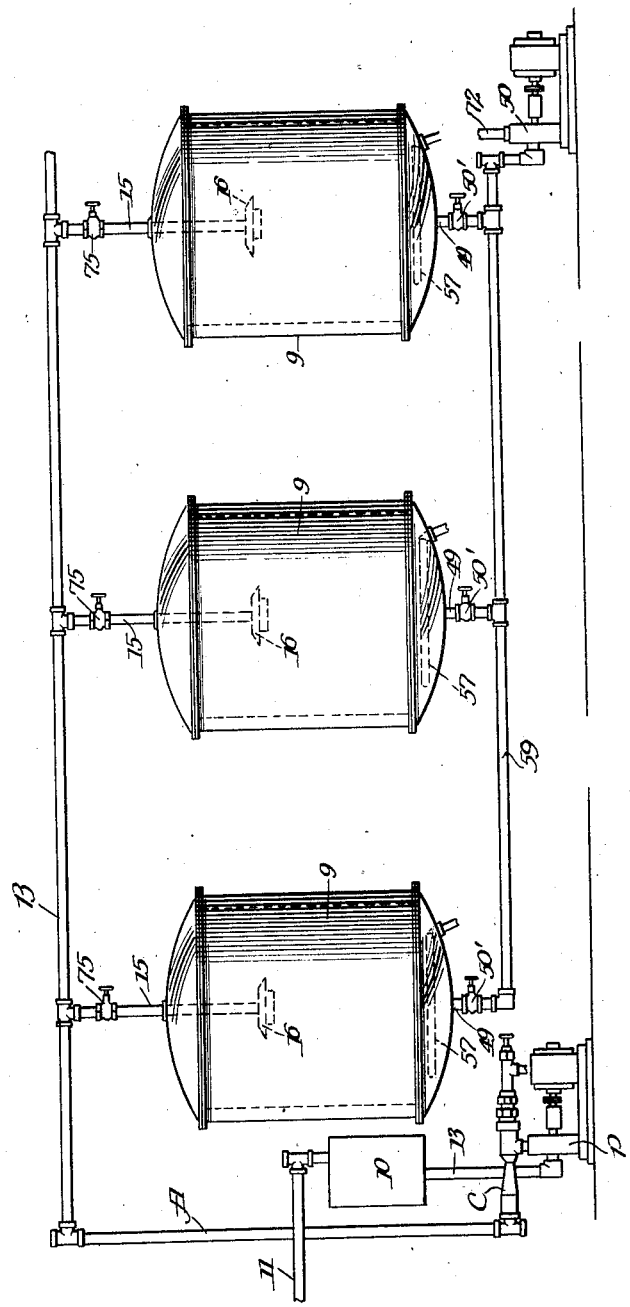

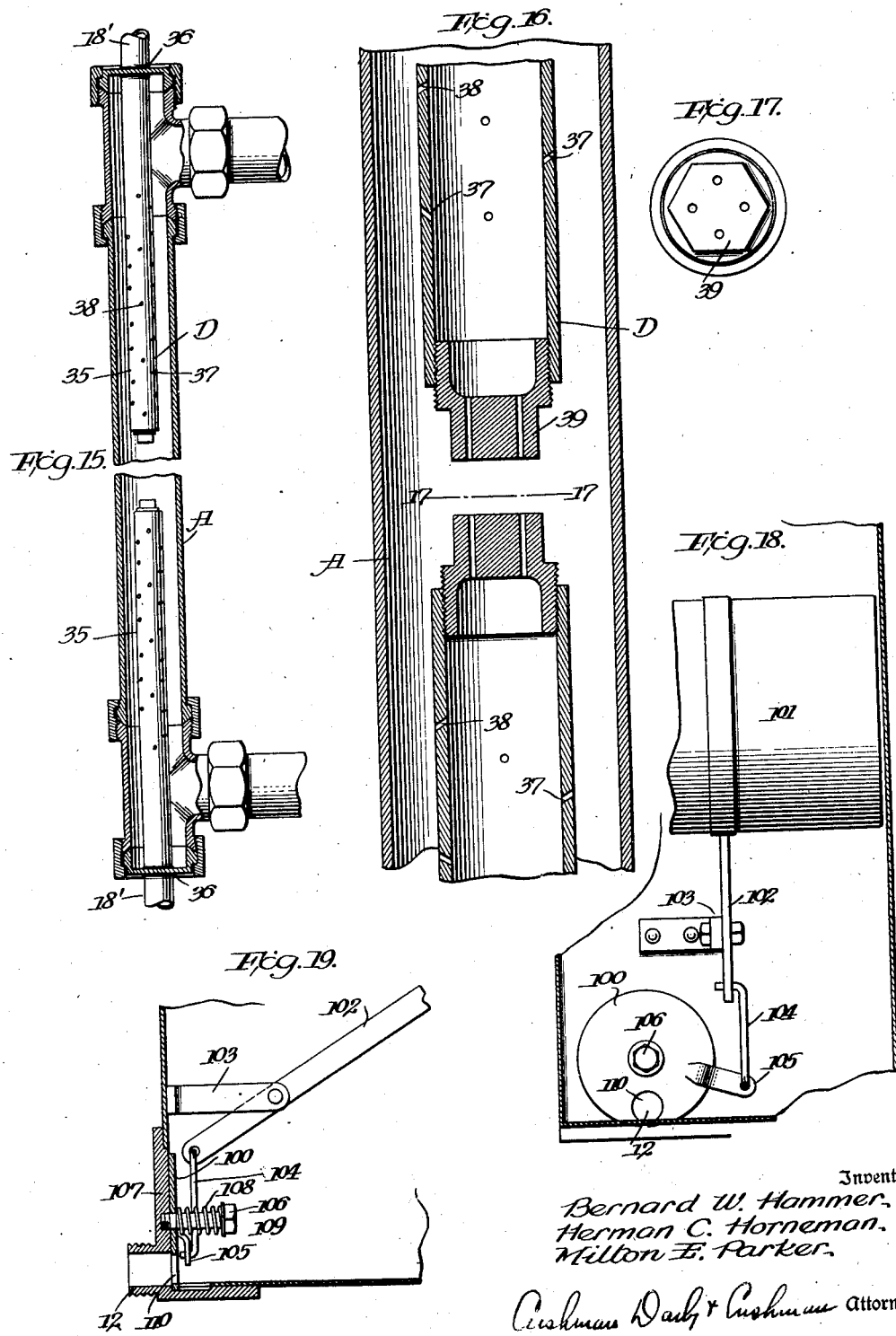

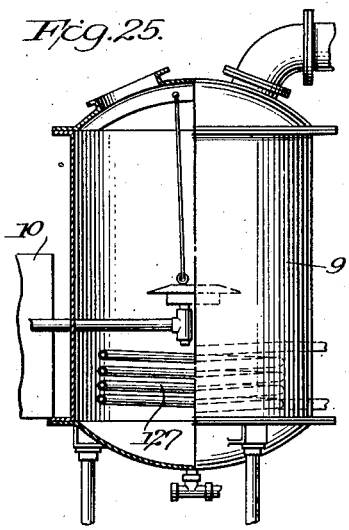
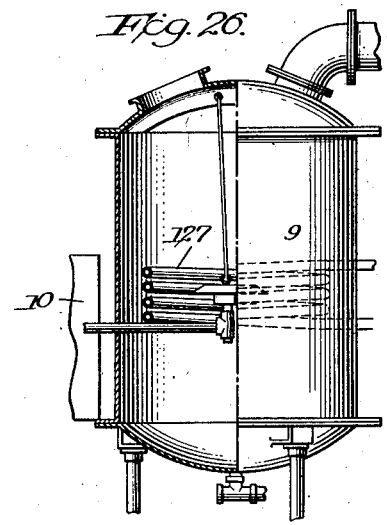
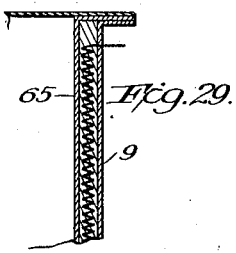
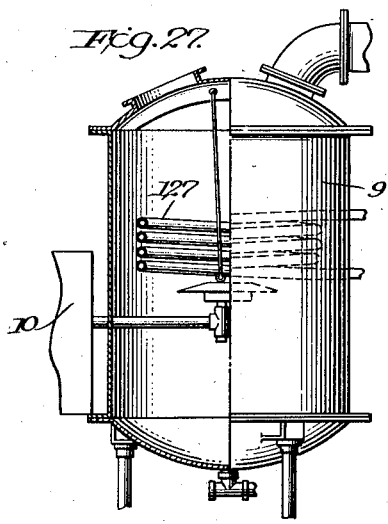
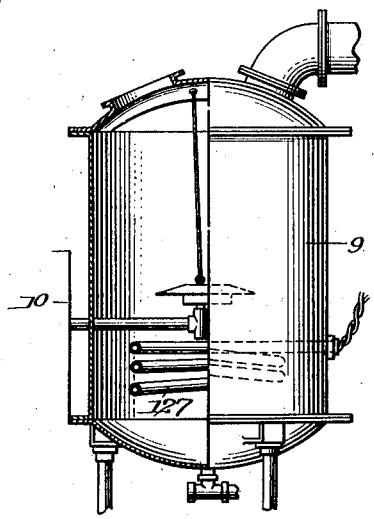

Patented Nov. 26, 1935

2,022,420

UNITED STATES PATENT OFFICE 2,022,420

PROCESS FOR TREATING LACTIC FLUIDS

Bernard W. Hammer, Ames, Iowa, and Herman C. Horneman and Milton E. Parker, Danville, Ill., assignors to Sealtest System Laboratories, Inc., New York, N. Y., a corporation of Maryland Original application March 26, 1935, Serial No. 13,168. Divided and this application July 19, 1935, Serial No. 32,284

15 Claims. (Cl. 99—11)

This invention relates to a process of (1) pasteurizing liquids; (2) deodorizing liquids (i. e., removing undesirable odors and off-flavors); and (3) cooling liquids. The process and/or apparatus are useful for accomplishing any two of these operations, or particularly, for carrying out all three, as an intermittent, continuous or simultaneous treatment. The invention is used in connection with various classes of liquids and fluids, of which milk, cream, and lactic fluids in general are exemplary.

Milk products such as milk or cream often have characteristic odors and flavors which are undesirable and must be removed. These develop from various sources and during certain periods of the year. Many of these objectionable odors and flavors are stubborn and tenacious and require drastic treatment to denude the lactic fluid of them.

In accordance with the process and/or apparatus of this invention, lactic fluids of the order of the milk or cream are rendered practically free of off-flavors and odoriferous substances regardless of their excessive concentration or persistence.

While conventional methods of pasteurizing and cooling lactic fluids such as milk or cream, do, to a limited extent, tend to improve the flavor and odor of these products by partially volatilizing the off-flavor and undesirable odor imparting substances therefrom, the present invention so augments and enhances this volatilizing effect as to reduce the off-flavors and odors to a negligible or substantially imperceptible quantity in the end product.

Briefly stated, the invention initially provides a steam treatment for (1) pasteurizing a fluid, for example, cream, and (2) subdividing the cream to release undesired substances and render those remaining in the cream, which may be in excessive concentration and/or persistent, potentially releasable, i. e., removable by subsequent treatment of the cream. This initial treatment takes place upon a travelling confined mass of the fluid-steam mixture.

Preferably, as a subsequent and continuous operation with the initial treatment, the pasteurized and subdivided cream in the form of a cream-steam-water mixture is continuously introduced through a reduced outlet into a vacuum chamber where, under conditions of reduced pressure, it, spontaneously and with violent and explosive force, expands into a fog or mist-like state. This final state of subdivision of the preliminarily treated cream permits separation of the undesirable volatiles simply and completely and recovery of the cream substantially devoid of objectionable off-flavors and odor imparting substances.

In the preferred form of the invention, the cream is compressed and heated; live steam at high temperature and the compressed cream are then formed into fine streams or jets of high velocity. The two jets are directed so as to intersect with violent agitation, whereby the cream is bombarded and shattered or sheared by the steam. Stated another way, two high velocity intersecting streams respectively of steam and cream are produced, the velocity of the cream being assisted by the aspirating effect of the steam, and the bombardment or contact of cream and steam results in heating of the cream, with (1) simultaneous tearing apart of the cream particles and subdivision thereof and intimate mixture of the steam with the cream, forming a cream-steam-water mixture having substantially a mist-like form, and (2) concomitant expansion of the mixture with enhanced tearing apart of the cream particles, in the zone of low pressure created by the high velocity streams.

As one means for accomplishing these effects, we employ a Venturi type of injector device having means for producing separate steam and cream jets of high velocity and in which the cream-steam-water mixture so formed is caused to expand by reason of the reduced pressure obtaining in the gradually enlarging side of the venturi and leading to a conduit which communicates with the vacuum chamber. Hence, a very fine subdivision is produced, namely, the resultant of (1) the discharge of the cream at high velocity through a reduced opening, (2) the bombarding and heating of the cream stream with steam at high velocity, and (3) the expansion of the cream-steam-water mixture in the tapering outlet in the venturi which latter increases in diameter toward its jointure with the conduit. This preliminary treatment will condition cream having excessive concentrations of off-flavors and odoriferous substances of the most tenacious nature, and result in the release of a substantial portion of these as volatiles and render the remainder potentially releasable to the optimum in the continuing procedure of the invention. Specifically, odoriferous and off-flavor substances are released due (1) to the mechanical tearing apart of the cream particles, and (2) to the expansion of the cream-steam-water mixture. As the cream-steam-water mixture passes beyond the influence of the zone of reduced pressure in the venturi, the velocity decreases and the conduit or line leading to the vacuum chamber becomes filled with the cream-steam-water mixture as a liquid column under increasing pressure. As will be understood, the fluid confined in the line will be under an increased pressure accompanied by a decrease in velocity, e. g., in accordance with the quantitative law with regard to changes in pressure and changes in speed as expressed by Bernoulli's theorem. The cream is pasteurized and further condition to enhance the release and potential release of undesired substances during travel in the line or conduit and the compressed cream-steam-water mixture is introduced into the vacuum chamber through a reduced outlet, spontaneously and violently assuming a fog or mist-like state.

We have also discovered, as a modification and in lieu of the initial treatment just described, that pasteurization and subdivision of the cream particles is satisfactorily accomplished by injecting live steam under pressure in the form of needle-like jets into a travelling liquid column of cream and producing a multiplicity of impacts or impingements by the steam upon the cream whereby mixture of the steam and cream takes place in a manner to agitate and thoroughly comb the cream with steam. At the same time, this treatment imparts to the mixture a turbulent and whirling movement in the direction of travel of the cream toward the vacuum chamber.

In each of the processes described, the cream is preliminarily (1) pasteurized at high temperatures in the line, (2) intimately mixed with steam and agitated and shattered, i. e., the cream particles are torn apart and subdivided by the steam and (3) conditioned to have the objectionable volatiles released or rendered potentially releasable.

In the initial steam treatment, the latent heat of the steam is very largely transferred to the cream and (1) part of the steam condenses and (a) the heat of condensation also is transferred to the cream, resulting in a cream-steam-water mixture having a pasteurizing or sterilizing temperature of substantially 200 to 250° F. or higher; (b) the condensation of the steam with sudden collapse of the steam bubbles upon coming in contact with relatively cooler cream will cause a breaking up of the fat globules wth consequent release or potential release of volatile odoriferous substances occluded within the fat globules, and (c) the heating effect, the release of volatiles, and the uncondensed portion of the steam produces a compression, and (2) the uncondensed steam exerts a sweeping action in that it serves as a carrier for the volatile or vapor phase constituents of the cream released by the shattering actions and heating effect of the steam.

The cream-steam-water mixture is compressed in the line or conduit (a) due to the heating effects of the steam as just described, (b) due to the pumping pressure for conveying the cream to the line and thence to the vacuum chamber, (c) because of the injection of steam under pressure, and (d) by reason of the back pressure created by the reduced size of the outlet of the distributor head in the vacuum chamber cooperating with the positive pumping and steam pressures. This compression of the cream-steam-water mixture in cooperation with the reduced pressure in the vacuum chamber and the reduced outlet in the distributor head causes the mixture to be discharged into the vacuum chamber with explosive and violent expansion whereby the mixture spontaneously assumes a substantially fog-like state. As will be appreciated, the fluid, while travelling to the vacuum chamber, is constantly treated and conditioned, being (a) heated, compressed, expanded and compressed, or (b) heated and compressed, and then (c) in either case, expanded in the vacuum chamber. As stated, the preliminary treatment and conditioning takes place while the cream is travelling in the line and the cream is preferably continuously introduced therefrom into the vacuum chamber, providing a continuous system. It is considered that the optimum conditioning of the cream is due to the presence of each of the several factors outlined which co-operate with each other to afford a preliminary treatment such that the final product is of enhanced quality and the operation economical and universal for plant practice.

By pasteurizing is meant heating the fluid during travel through the conduit in direct contact with the steam and within both the conventional flash pasteurizing range of substantially 165 to 190° F., and particularly at higher temperatures, i. e., above the normal flash pasteurizing temperatures and within a sterilization range of substantially 200 to 250° F. or higher. In other words, pasteurization at a high temperature, that is, above the boiling point of the fluid at normal atmospheric pressure, is accomplished with this invention.

With respect to the vacuum chamber, we have found that by recourse to either of the preliminary treatments described, and the use of a distributor head having a reduced outlet, optimum advantage can be had of the reduced pressure maintained within the vacuum chamber. That is, the cream is conditioned in the line for optimum expansion in the vacuum chamber so that the two stages or steps are interdependent and assure the desired final result, namely, a cream substantially denuded of its objectionable characteristics. The vacuum chamber affords a simple and efficient means of separating and removing the vapor phase constituents, including the undesirable volatiles, from the cream.

The vacuum chamber is characterized by being heated. In this manner condensation of water vapors and condensable odoriferous and off-flavor imparting volatiles and their attendant objectionable return to the cream is prevented; likewise separation of liquid and vapor phase constituents is maintained or prolonged, and, moreover, complete separation of liquid phase particles of cream is obtained.

As will be appreciated, where steam is used, a cream-steam-water mixture will be produced, while the lactic product is initially heated under compression, and the expansion treatment of this cream-steam-water mixture in the vacuum chamber is characterized by removal of moisture and odoriferous and off-flavor imparting substances. As a result, the end product has improved organoleptic qualities and a moisture content substantially that of the original cream. That is, although dilution will take place in the initial compression and shattering of the particles with steam, this condensation water is more or less removed in the subsequent expansion-subdivision treatment in the vacuum chamber and the mixture is condensed whereby the final effect is one of recovering the cream in substantially its original volume but denuded of objectionable flavors and odors.

Another advantageous step of the process of this invention, as where the concentration of off-flavors and/or odors is excessive or of a stubborn nature, resides in subjecting the cream either (1) to a preliminary steam scrubbing or deodorizing distillation treatment prior to the initial compression, and subsequent expansion in the vacuum chamber as above described, and/or (2) to a similar scrubbing (a) continuously in the presence of the expansion treatment, (b) continuously in a separate chamber, or (c) in batch in the vacuum chamber or a separate chamber.

Preferably, the cream is continuously collected in the vacuum chamber, and successive portions thereof are continuously subjected in the vacuum chamber, during the expansion treatment therein to a steam scrubbing accompanied by odor and off-flavor removal. This operation removes additional, i. e., remaining odor and flavor imparting, substances from the cream and is preferably simultaneous and continuous with the forming of the mist or fog by the violent and spontaneous expansion of the cream-steam-water mixture in the vacuum chamber.

In some cases, the scrubbing treatment is carried out in a separate vacuum chamber, the scrubbing with steam being continuous with the expansion treatment in the other vacuum chamber. Again, intermittent batches are (1) scrubbed in a separate chamber; or (2) are scrubbed in the same vacuum chamber upon completion of the expansion treatment therein.

The advantage of having the scrubbing substantially immediately follow or be continuous with the expansion treatment in any of the processes described resides in the saving effected, in that the cream will be at a temperature such that reheating thereof is unnecessary as a preliminary to scrubbing.

This scrubbing takes place upon the cream while the latter is at its boiling point under the condition of vacuum being maintained. The live steam at high temperature and pressure, e. g. around 325° F. and eighty pounds gauge, is injected into the mass of cream at the bottom thereof and immediately expands, sweeping through the cream and mechanically removing objectionable odor and flavor imparting substances. No substantial evaporation of the cream takes place and the effect therefore is one wherein the steam agitates and passes through the cream without appreciably raising the temperature of the cream, but at the same time, releases and carries off the undesired substances.

A primary object of this invention is to provide means for pasteurizing a fluid such as cream at temperatures considerably higher than those conventionally used and without detrimental effect upon the final product. This is made possible by the rapid heating and instantaneous cooling to which the lactic fluid is subjected whereby pasteurizing temperatures of substantially 200 to 250° F. or higher may be safely employed. In other words, in conventional operations the temperatures of pasteurization must be below the boiling point of the lactic fluid being treated at normal atmospheric pressure, whereas, with the present invention, this limitation does not obtain.

By rapid heating is meant the heating of a continuously flowing mass travelling at a speed of the order of substantially three to five pounds (about ½ gallon) per second past a given point under the high temperatures recited and under a pressure of substantially ten pounds gauge and higher.

In referring to instantaneous cooling, we mean spontaneous cooling obtained by suddenly releasing the pressure on the heated fluid in the conduit, e. g., by introduction of the fluid into a vacuum chamber, whence it assumes, by reason of the cooperation of a distributing head having a restricted outlet, a finely divided or mist-like condition and undergoes a sharp and immediate reduction in temperature induced by the reduced pressure in the vacuum chamber.

This combination of steps in a continuous operation, of rapid heating and instantaneous cooling with reduction of the fluid to a fog-like state, (thereby exposing maximum surface for cooling) permits utilization of high temperatures within the sterilization range and without detrimental effects on the organoleptic and physical characteristics of the final product.

In fact, it has been found that the physical characteristics of the product, e. g., cream, are actually enhanced, whereby the stability of the finally recovered cream emulsion is improved to the extent that separation of the cream into a cream and skim milk layer is prevented. Furthermore, the stability of the recovered cream emulsion, i. e., the final product, is such as to minimize, and in most instances eliminate, the so-called feathering of cream when used in coffee or other hot beverage. This enhanced stabilizing effect is also valuable in the processing of ice cream mix and the pasteurization of milk used in the manufacture of cheese, concentrated milks, fermented milks, and milk powder. The stabilizing effect is so definite that milk powder made from milk thus treated possesses improved properties when used in baking applications. This stabilizing effect is due to the greatly enhanced dispersion of fat globules and the increased viscosity of the milk, resulting from (a) the shattering effect during the preliminary treatment promoting dispersion, and (b) the subsequent spontaneous expansion in the vacuum chamber providing instantaneous cooling.

Another important feature of the invention is to provide effective control of the temperature and pressure conditions and assure that the cream, for example, will be thoroughly pasteurized and rendered in the optimum state for treatment in the vacuum chamber.

The present invention embodies process and apparatus inclusive of the subject matter of the applications of Herman C. Horneman, Serial No. 654,069, filed January 28, 1933, and Serial No. 681,656, filed July 21, 1933, and relates to improvements thereon.

Other objects and novel features and advantages of this invention will be apparent from the following specification and the accompanying drawings. In the drawings, Figures 1 and 2 are plan views partly in section of the preferred process and apparatus for practicing the invention;

Figures 3 and 4 are vertical sections on the line 3—3 and 4—4, respectively, of Figures 1 and 2;

Figure 5 is a view partly in section and partly in elevation of one form of apparatus for practicing the invention;

Figure 6 is a similar view partly broken away of another form of apparatus for practicing the invention;

Figures 7 to 9 and 11 are similar views in accordance with the disclosure in said aforesaid Horneman applications;

Figure 10 is a top view partly broken away of Figure 7.

Figure 12 is a side elevation including a plurality of vacuum chambers or vacuum-chamber-scrubbers connected so as to be selectively operable, this construction being used in association with any of the apparatus shown in Figures 1 to 11 and 25 to 29;

Figure 13 is a detail sectional view of a preferred type of steam injection apparatus, useful in connection with each of the apparatus of Figures 1 to 12 and 25 to 29;

Figure 14 is a section on the line 14—14 of Figure 13;

Figures 15 and 16 are detail sectional views of another form of steam injection apparatus and useful in association with the apparatus of Figures 1 to 12 and 25 to 29;

Figure 17 is an end view of one of the nozzles of Figures 15 and 16 looking toward the line 17—17;

Figures 18, 19 and 20 are views partly in section and partly in elevation, and broken away, showing a surge tank and several types of float valve mechanism associated therewith, used in connection with the apparatus of Figures 1 to 12 and 25 to 29;

Figures 21 to 24 are sectional views of distributor heads each having a restricted outlet, and employed with each of the apparatus of Figures 1 to 12 and 25 to 29;

Figures 25 to 28 are sectional views of vacuum chambers or stills useful in connection with each of the apparatus of Figures 1 to 12;

Figure 29 is a detail section showing electrical resistance means for heating the wall of the vacuum chamber or still;

Figure 30:
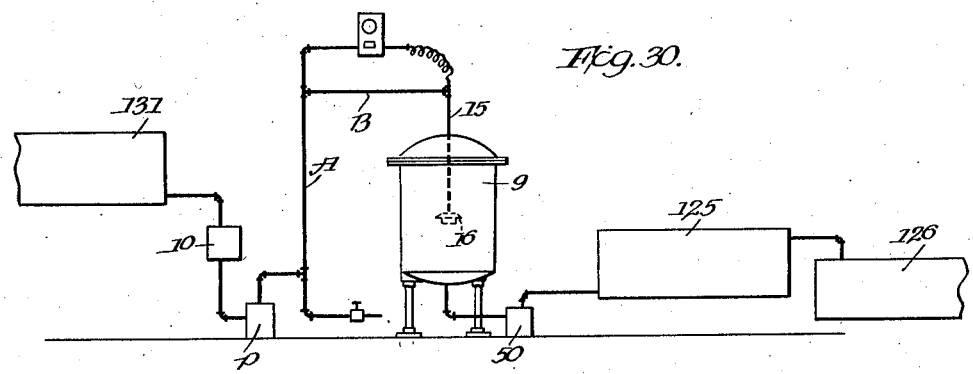
Figure 30 is a diagrammatic view showing the preferred process in accordance with the present invention.

In general, the apparatus and process is similar to that shown and described in the aforesaid Horneman applications, embodying, however, improvements which render the invention more flexible and efficient both as regards the quality of end product recovered and economics of operation.

In Figures 1 to 12, the numeral 9 represents a closed metal container equipped to operate as a vacuum chamber and also in some cases as a vacuum scrubber or still. This vacuum chamber is preferably heated as will be later described. The liquid to be treated is introduced into a surge tank 10 through a pipe 11 from a forewarmer or other means where it has been preliminarily heated to a suitable temperature and/or otherwise treated. The surge tank 10 is provided with a float controlled outlet 12, as shown in Figures 18, 19 and 20. The outlet 12 is connected by a pipe 13 to a motor operated pump P, preferably of the positive type, capable of impressing a pressure of five to fifty pounds, or more, on the liquid. The liquid is pumped through the pipe 14 to a line comprising pipes or conduits A—B suitably connected, and from the conduit B is introduced into the vacuum chamber 9 by the communicating pipe 15 having a distributor head 16 provided with a reduced outlet as shown in detail in Figures 21 to 24. Referring to Figures 1, 2, 6 and 12, a steam injection device C, shown in detail in Figures 13 and 14, is interposed between the pump P, pipe 14, and the pipe A; in Figures 5, 7, 8, 9 and 11, another type of steam injection device D, shown in detail in Figures 15 and 16, or an injection device as provided in said Horneman applications, is disposed in the line A. If desired, the two devices C and D may be combined. In such event, the steam injection means D is used for forewarming the cream supplied to the surge tank 10, being interposed in the line 11, and the usual forewarmer, e. g., flash pasteurizer or barrel heater, omitted. Either of the steam injection means C or D or both are used in association with each of the apparatus shown in Figures 1 to 12 and 25 to 29. This, briefly, describes the general system employed and details of the apparatus will be further elucidated.

The invention is useful for treating a large variety of liquids, and finds particular utility in the case of lactic fluids such as milk and cream. These, as heretofore stated, often possess objectionable odors and off-flavors, and the invention will be exemplified in the removal from cream of substances imparting such undesired characteristics.

Generally stated, the cream is (a) pasteurized within a sterilization range while travelling in the line A—B and/or pipe 15 by reason of live steam which is preferably introduced at proper pressure and temperature; (b) the cream particles are torn apart by agitation and impact with the steam and this shattering action, which takes place while the cream is moving from the pump to the vacuum chamber, releases the off-flavor and odoriferous substances and/or renders them potentially releasable; (c) the cream-steam-water mixture is discharged through the reduced outlet of the distributor head 16 and spontaneously with explosive force expanded to a mist or fog-like state; (d) a heated vacuum chamber is employed whereby condensation of vapor phase constituents is prevented and separation of liquid and vapor phase constituents is prolonged; and (e) maximum subdivision of the cream particles is obtained in the vacuum chamber enabling substantially complete removal of the odoriferous and off-flavor imparting volatiles. The very effective results are made possible (1) by the efficiency of the preliminary subdivision of the cream while travelling to the vacuum chamber and (2) by the cooperation of the vacuum treatment, whereby the cream is substantially denuded of undesired volatiles, or by simple and inexpensive subsequent treatment rendered so.

Stated briefly, the cream, while travelling in the line A—B or A—B—15, is compressed, due to the cooperation (a) of the heating effects, (b) of the pump P at one end and (c) the restricted outlet in the distributor head 16 at the other end of the system, and (d) the steam at high pressure and temperature which is introduced into the cream and also cooperating with said restricted outlet; thereafter the cream-steam-water mixture is violently expanded in the vacuum chamber. In the case of the steam injector device shown in Figure 13 in detail and in Figures 1, 2, 6 and 12, the cream is heated in the Venturi device and compressed between the pump at one end and the restricted Venturi port at the other, then projected through the port at high velocity as a thin stream or cone into contact with an intersecting thin jet or cone of live steam at high velocity, with accompanying decrease in pressure, and the cream-steam-water mixture is expanded in the gradually enlarging Venturi outlet; thereafter the mixture fills the line A as a liquid column and is under the pressure created by the heating effect, the pump, distributor head and steam pressure, as above described.

The heating of the continuously travelling cream, in addition to accomplishing pasteurizing or sterilizing, also acts to agitate the cream whereby the cream particles are shattered and torn, and the released objectionable substances are volatilized and retained in this condition so that they are readily removable in the vacuum chamber as vapor phase constituents. At the same time, the breaking up of cream particles assures uniform and minute subdivision and uniform heating for pasteurizing and sterilizing; of equal importance and, in fact, of particular significance, where the odor or off-flavor imparting substances are tenacious and/or excessive, this preliminary and intimate subdivision renders such stubborn substances potentially releasable, i. e., readily removable as vapor phase constituents by the vacuum chamber treatment or by a simple and inexpensive further treatment as will be later set forth.

Referring to Figures 1, 2, 6, 12, 13 and 14, the steam injection means C has a steam inlet 18 communicating with a steam line 18' and a fluid inlet 19 communicating with the outlet pipe 14 of the pump P. This steam injection means has the form of a venturi but any suitable construction capable of producing heating and compression of the cream, intersecting thin streams of cream and steam at high velocity, and expansion of the cream-steam-water mixture followed by a return of pressure on the mixture may be used.

The Venturi device has a pair of outlet ports 20 and 21, respectively, communicating with the steam and fluid chambers 22 and 23 supplied by the inlets 18 and 19, and which ports 20, 21 are restricted and controlled by the adjustable valves 24 and 25, respectively. The valve 25 is regulated by engagement of the nut 26 with the threaded sleeve 27; the valve 24 is carried on a stem 28 having adjustable threaded connection with a bushing 29 and the stem is provided with a handle 30 for regulating the adjustment. The ports 20, 21 are continuous, concentric and preferably circular, and the size of the openings is minutely controlled by regulating the valves 24, 25, as described.

The steam port 20 is defined by inwardly directed closely spaced sides, one having greater inclination than the other and forming a tapering restricted continuous opening whereby the steam supplied at a gauge pressure of eighty to one hundred pounds, i. e., 325 to 340° F. to chamber 22 is ejected substantially in the shape of a cone or fine stream at high velocity into the constricted portion 31 of the venturi and the adjacent enlarged portion 32 thereof. The outlet port 21 for the cream is defined by parallel, continuous inwardly directed sides closely spaced, i. e., forming a restricted outlet, whereby the cream introduced to the chamber 23 under a pumping pressure and compressed by cooperation of the pump with the restricted outlet port 21, is broken up and similarly discharged substantially as a cone or fine stream at high velocity with the assistance of the aspirating effect created by the steam jet, and intersects the stream or cone of high velocity steam. The thin intersecting streams of steam and cream ejected at high velocity create in the gradually enlarging or tapering side 32 of the venturi a condition or zone of reduced pressure. This tapering portion 32 at its widest diameter merges into or is connected into communicating relation with the line A, as shown at 33. Referring to Figure 13, the cream in chamber 23 is subjected to a heating by contact with the heated wall of the steam chamber 22.

There takes place in the treatment just described (a) compression and heating of the cream, (b) a tearing apart of the cream particles by reason of the bombardment of steam and cream, (c) an expansion of the cream-steam-water mixture thus produced, resulting in further and more intimate subdivision in the zone defined by the tapering portion 32, and then (d) compression of the mixture as it fills the conduit A as a liquid column. Subdivision of the cream is thus very complete and fine, and the odoriferous and off-flavor imparting substances are released or rendered potentially releasable. Initial pasteurization and sterilization also take place and are completed in the line A—B. The heated mixture in the line A—B is agitated and compressed and an intimate mixture of steam with the cream particles is maintained. This agitation and compression continues during travel of the mixture in the line A—B whereby the released volatiles, under conditions prevailing in the line, will be prevented from returning to their former combined state, and the release and potential release of additional undesired substances will occur; also the cream is enhanced so far as rendering potentially releasable the more tenacious substances. This preliminary conditioning of the cream and its pasteurization is aided by the high temperature of the mixture, namely 200 to 250° F. and higher.

While in Figures 1, 2, 6 and 12 the steam injection means is disposed horizontally, it operates with equal facility when disposed in a vertical plane.

A feature of this construction of particular importance resides in the minimum of control required. For example, the valves 24, 25 can be set and the steam and cream at predetermined temperatures and pressures passed to the injection device C, whereupon a constant temperature will be maintained, with uniform heating and subdivision of the cream.

A greater subdivision is, moreover, obtained in the vacuum chamber 9 by reason of the fine subdivision resulting from this preconditioning. The restricted outlet in the head 16 may, in some instances, be adjusted as low as ten one-thousandths of an inch (.010") without retarding the speed of operation. At the same time, the most tenacious and stubborn odoriferous and off-flavor substances are removed. As to the latter element of speed, the high velocity treatment speeds up the flow and, moreover, prevents clogging or coating of the injection device or the line, since uniform heating takes place and little or no opportunity is presented for precipitation of curd which would tend to collect in the line were there any uneven heating or overheating.

The subdivision of the cream by using the injection device C in cooperation with line A—B—15 and associated devices is very effective and efficient so far as pasteurizing, and release or potential release of volatiles, is concerned, because of the initial bombardment of a thin continuous high velocity stream of cream with a similar stream of steam and followed by (1) expansion and (2) compression, since there actually takes place a treatment of a small body of cream with a large body of steam.

As illustrating another form of injection device and referring to Figures 15, 16 and 17, nozzles 35 connected to the steam line 18' are introduced through fluid-tight fittings into the upper and lower ends of the conduit A as shown at 36, and to heat the fluid in the line to a pasteurizing or sterilizing temperature. For example, an inert gas such as steam at eighty to one hundred pounds gauge pressure and at a temperature of approximately 325 to 340° F. is injected into the fluid in the conduit A, through the nozzles 35.

The nozzles 35 are disposed in spaced relation in the conduit A and extend toward one another as shown. Each nozzle is provided with a plurality of narrow or small diameter spirally arranged spaced ports (about $\frac{1}{16}"$) inclined at substantially 30°. The ports 37 open upwardly, i. e., inject the steam in the direction of travel of the cream flow; the ports 38 open downwardly, while the opposed longitudinal ports 39 of the respective nozzles inject the steam parallel to and reversely of the cream flow. In this manner, a turbulence and whirling of the fluid is obtained, assuring intimate mixing and uniform heating of the fluid, and compression of the cream-steam-water mixture because of the pressure created (1) by the heating effects, (2) by the steam in cooperation with the pressure created by (3) the restricted outlet in the distributor head at one end of the line and the pumping pressure at the other end. A very complete subdivision of the particles in the case of milk and cream with resultant enhanced release and potential release of volatiles and odoriferous substances therefore is obtained.

The ports 37 preferably number about twenty while the ports 38 number about twelve and the ports 39 about four. This ratio may be departed from as desired but it is preferable that the ports 37 injecting steam in the direction of cream flow predominate. The ports may be formed throughout the length of the nozzles or only partially as shown.

In operating the apparatus at a gauge pressure of approximately 10–15 pounds in the line A—B, the fluid, when it reaches the vicinity of the upper nozzle, has a temperature of substantially 190 to 205° F. and this is raised to about 210 to 230° F. by the steam treatment at this point. The temperature of the cream-steam-water mixture will be controlled through the medium of this upper nozzle. For example, it has been found with a vacuum of twenty-four inches to twenty-six inches in the chamber 9, that a gauge pressure of about ten to fifteen pounds and temperature of 210 to 230° F. for the cream-steam-water mixture in line A—B will produce very satisfactory results. Therefore, we associate with the upper nozzle a thermostatic control indicated as a whole at 40 as shown in Figure 5 to regulate the steam injected and by consequence adjust the temperature of the cream-steam-water mixture.

In the use of the ejector D, very satisfactory pasteurization and subdivision of the cream particles is accomplished in line A—B by injecting live steam under pressure through the spaced ports 37, 37, 39 of the nozzles 35 in the form of needle-like jets and into the cream. This produces a multiplicity of impacts or impingements by the steam on the column of cream travelling in the line A—B whereby mixing of the steam and cream takes place in a manner to agitate and thoroughly comb the steam with cream. Due to the spacing and angular disposition of the ports, a turbulence and whirling in the direction of travel is imparted to the cream-steam-water mixture. Substantially similar effects and results are obtained as with the injector device C, but the latter gives more positive control and is more effective.

In connection with the use of a pump, this, in association with the distributor head 16, and either injection device C or D, increases the effectiveness of the process and the capacity of the apparatus materially. Where the injection device D is employed, the temperature of the mixture in line A—B—15 is regulated by the thermostat 40, and the pressure head in line A—B—15 is adjustable by regulating either the pump or distributor head 16 or both. These control features are all available and employed where the injection device C is used but ordinarily by reason of the relatively finer adjustments afforded through the use of the venturi, no thermostatic control 40 is needed.

Hence, it is possible to exercise a precise control, and the condition of the cream-steam-water mixture, i. e., temperature and pressure, in the line A—B is susceptible of nice regulation at all times, using either injection device to accomplish optimum results. As will be appreciated, this is very important in a continuous system such as comprehended by the present invention, assuring both uniform and complete pasteurization, and subdivision of the cream-steam-water mixture. Stated briefly, the treatment of the fluid in line A—B is maintained substantially constant and the cream is introduced through the distributor head in optimum condition for the instantaneous and explosive expansion, to which it is subjected in the vacuum chamber and a desired pressure differential of about two atmospheres is constantly held between the vacuum chamber 9 and the line A—B.

The line A—B, it will be noted, is relatively long and this allows of very complete pasteurization as well as an extended time period for utilizing the compression effects to (1) subdivide the cream and (2) accomplish release and potential release of objectionable substances.

The cream-steam-water mixture in the line A—B is distributed in the vacuum chamber 9 by means of the distributor head 16 which nas a narrow, preferably elongated or continuous peripheral, opening 41, as will be later set forth in detail and as shown in Figures 21, 22 and 23. At the opening 41, the pressure of the cream-steam-water mixture in the line A—B is suddenly released due to the reduced pressure in vacuum chamber 9 and it is expanded with spontaneous and violent force downward into the chamber. We have found that a pressure differential of substantially two atmospheres between the line A—B and the vacuum chamber will produce very excellent results. The vapors and gases released by the expansion of the cream-steam-water mixture in the vacuum chamber 9 through head 16 are carried off through a port 42 and pipe 43 to the condenser 44 and vacuum pump 48 as shown in Figure 5. The liquid portions of the cream or milk will coalesce and collect at the bottom of the vacuum chamber 9 and will pass by outlet pipe 49 to a suitable pump 50, so that the coalesced liquid can be continuously removed through a pipe 70.

Referring to Figures 1 and 2, 12, 30, 31 and 32, in some cases where excessive concentration of objectionable substances are present or they are tenacious, the coalesced liquid having a temperature of substantially 130° F. to 145° F. is subjected to a steam scrubbing treatment.

In the process and apparatus shown in Figures 1 and 2, the cream-steam-water mixture is discharged with violent expansion and assumes a fog-like state substantially within the confines of a receiving member 51 of generally cup-shaped form (Figure 1) or an inclined baffle 52 (Figure 2) supported in the vacuum chamber. The receiving member 51 has an inclined bottom terminating in a pipe 53 and the bottom of the chamber 9 is divided by a plurality of partitions 54 shown in detail in Figures 3 and 4, defining compartments 55, as shown in each of Figures 1 and 2. The baffle member 52 and the pipe 53 are adapted to discharge the coalesced cream into one of the end compartments continuously as shown. As many compartments may be employed as desired, and they are made communicative by outlets 56.

In each compartment 55 is disposed a perforated steam pipe 57 which supplies live steam at a suitable temperature and pressure for scrubbing the portions of coalesced cream collected in said compartments. A sufficient number of openings are provided in the pipes 57 to impart an agitation and turbulence to the cream portions undergoing steam scrubbing in the vacuum chamber.

The outlets 56 are disposed at a level such that flow of cream from one compartment to the other will take place continuously and the height of each baffle or partition 54 above each outlet is such that foaming over is avoided. In this connection, the ends of the partitions 54 are bent over as shown at 58 so as to divert any foam back into the mass portion under treatment.

With the apparatus shown in Figures 1 and 2, successive portions of coalesced cream are given a consecutive steam scrubbing in each compartment. The flow is continuous and the treatment simultaneous with, i. e., in the presence of, the fog produced upon the introduction of and expansion of the cream-steam-water mixture in the vacuum chamber 9. The finally treated cream is withdrawn through the other end compartment by the medium of the pipe 49 and pump 50 and thereafter suitably cooled. In this connection, control of the flow through the compartments is provided for by regulating the quantity of cream-steam-water mixture introduced to the vacuum chamber through the distributor head 16. Additional outlet pipes 49' preferably for drainage purposes are provided having suitable valves 50', the pipes 49 and 49' being connected to a line 59 leading to pump 50.

The objectionable volatiles separated by the expansion treatment and volatilized and swept out in the steam scrubbing operation are drawn off through the port 42 and pipe 43.

The process and apparatus of Figures 1 and 2 involves using a single vacuum chamber for accomplishing simultaneous and continuous (1) introduction of the cream-steam-water mixture into the vacuum chamber and expansion thereof into a fog or mist, (2) steam scrubbing of the collected coalesced cream in the presence of the mist, (3) removal of the objectionable vapor phase constituents resulting from each of these operations, and (4) removal of the finally treated cream in a steady stream.

The vacuum chamber 9 is also useful for scrubbing batches of coalesced cream. Thus, the cream is collected in one or more of the compartments 55 to a desired level, whereupon the discharge of the cream-steam-water mixture through the distributor head 16 is stopped and the steam scrubbing means 57 operated.

The simultaneous scrubbing or operation of the batch treatment immediately subsequent to the expansion treatment before the batch has cooled is advantageous in that the coalesced cream is at a temperature sufficiently elevated to render the steam scrubbing immediately effective, thereby making possible a substantial saving in steam.

In Figure 1, the receiving member or funnel or cup-shaped pan 51 is supported in any desired position with relation to chamber 9 by suitable radial brackets (not shown) connected thereto and to the wall of the chamber 9. In Figure 2, the baffle 52 is connected to the wall of the chamber by welding its edges thereto as at 60 or in any other suitable manner, as in Figure 4.

Surrounding the vacuum chamber 9 is a spaced wall 65 constituting a jacket which is heated electrically or within which is circulated a heating medium either of gas or liquid but preferably hot water. The temperature of the heating jacket should be about twenty degrees above the temperature in the vacuum chamber and under conditions of twenty-four to twenty-six inches of pressure in the chamber 9, the inner wall of chamber 9 should have an approximate temperature of 165 to 150° F. The inlet and outlet for the circulating medium are indicated at 66 and 67, respectively.

The heating jacket 65 assures that the inner wall surface of the chamber 9 will be at a constant temperature and serves to reduce to a minimum the possibility of condensation of water vapors and gases on the wall, as well as produce a prolonged separation of vapors and odoriferous and off-flavor gases from the liquid phase particles. This heating jacket 65 serves to maintain the wall of the chamber 9 at all times heated to the temperature above the boiling point of the cream, according to the conditions of vacuum in the chamber 9. As heretofore stated, a temperature at least twenty degrees above that of the chamber 9 should be present in the jacket 65 for maintaining the wall at elevated temperatures.

Thus, a heated vacuum chamber is employed, the heating means being constituted by the jacket 65 and steam scrubbing and distilling means 57. In some cases, the jacket 65 may be omitted but its use is preferred.

The temperature of the cream-steam-water mixture in line A—B before introduction into the chamber through the head 16 is substantially 200 to 250° F. or higher. A vacuum of twenty-four to twenty-six inches is normally maintained in the vacuum chamber. The expanded cream drops in temperature in the chamber to a temperature corresponding to its boiling point under the conditions of vacuum being maintained. Under the conditions recited, namely twenty-four to twenty-six inches of vacuum, this temperature normally is reduced to about 145 to 130° F. High pressure live steam is preferably used in the scrubbing means, e. g., eighty to one hundred pounds gauge pressure and each portion in the continuous flow or in batch scrubbed for a varying period, usually short, e. g., five to ten minutes depending on the cream.

A feature of the process resides in the fact that the steam scrubbing treatment is performed under conditions whereby the coalesced cream retains substantially its original form without being appreciably condensed or diluted. The effect of the steam sweeping through the cream is (1) to vaporize to some extent and (2) particularly to mechanically remove any remaining small concentrations of odoriferous and off-flavor imparting substances.

The process and apparatus described in connection with Figures 1 and 2 is preferred and the resultant treated cream may be used in the manufacture of dairy products, particularly butter and sour cream of enhanced quality.

Figure 31:
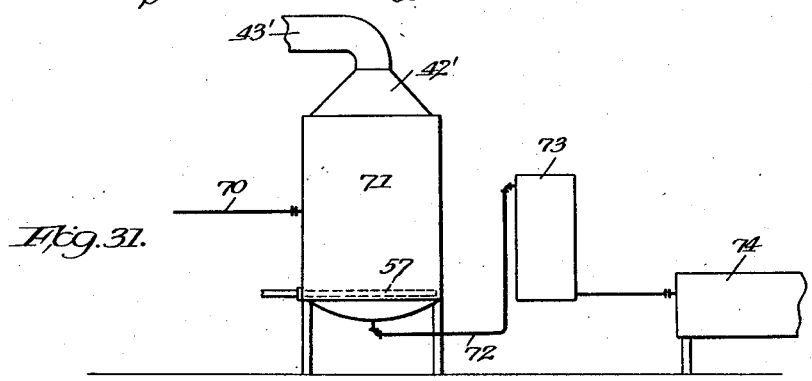
Figure 31 is a similar view, partly broken away of another process.

Referring to Figures 5 to 11, and particularly Figure 31, instead of carrying out the scrubbing operation in accordance with Figures 1 and 2, the coalesced cream either continuously or as a batch is pumped from chamber 9, at a temperature of about 130 to 145° F. by means of pump 50 through a line 70 to a vacuum still or steam scrubber 71. This scrubber is of conventional design and comprises means such as a steam pipe or injector 57 for injecting steam into the cream and steam scrubbing the same. The volatiles are withdrawn through the outlet 42', 43' and the treated cream is carried off by the line 72 from the bottom of the still. The vacuum distillation or steam scrubbing will be carried out at a vacuum of substantially twenty-four to twenty-six inches in the still and the cream need only be treated for a short time as above explained. The cream is collected through the line 72 in either Figures 1 and 2 or Figure 31 and passed through a cooler 73 where its temperature is reduced to about 70 to 80° F. From the cooler, the cream is carried to a suitable storage tank 74.

In some cases and referring to Figure 12, the vacuum chamber 9 is equipped to operate also as a vacuum still substantially similar to the vacuum-chamber-stills shown in Figures 1 and 2. In such case, the cream is allowed to selectively collect in batches in the respective vacuum-chamber-stills 9 and then the batch is selectively scrubbed in vacuum as heretofore described. Thus, in Figure 12, the combined vacuum-chamber-stills 9 are connected in multiple with the line A—B through the respective distributor head pipes 15 provided with shut-off valves 75, so that expansion and collection in one or more chambers 9 will take place while scrubbing and distillation of a batch of the cream previously collected in the other of said chambers is being carried out. A draw-off line 59, connected in multiple with the bottoms of said chambers by pipes 49 having suitable shut-off valves 50', is provided, and the finally treated cream is selectively drawn off by pump 50 and carried by line 72 and cooled or otherwise treated as herein described.

Such scrubbing treatments of the cream are advantageous in that they may be (1) continuous with the previous expansion treatment, or (2) operate as a batch process, and in each case this is readily accomplished with saving of steam since the cream as recovered in or from the vacuum chamber 9 is at a sufficient temperature not to require a further heating before treatment with the scrubbing steam.

Any of the several processes involving steam scrubbing as described herein is speedy and economical and, as stated, will be used in some cases to remove excessive concentrations of objectionable substances or where such substances are unusually tenacious. The results obtained are exemplified in the case of cream used in butter making, where the butter has been found to have a score advantage of from two to three points higher than that obtained by conventional methods.

The steam scrubbing will, in some instances, as will be appreciated, not be necessary to produce a butter of a satisfactory score or quality, the previous operations of the process being sufficient.

Figure 32:
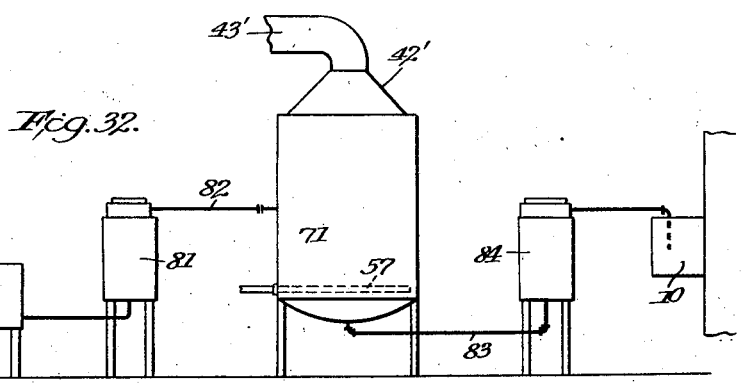
Figure 32 is a similar view showing a still further process.

Referring to Figure 32, instead of subjecting the cream from the chamber 9 to a subsequent distillation treatment, this treatment can be made preliminary to the introduction of the cream to the surge tank 10. However, we do not prefer the preliminary treatment since, where the cream is subsequently scrubbed, no further heating is required, and the distillation can be accomplished as a continuous step in the processing of the cream. Where the distillation or purifying treatment precedes the pasteurizing and deodorizing operation, the cream from the supply 80 is passed through a flash pasteurizer or other conventional heater 81 and the temperature thereof raised to about 130 to 145° F. Thereafter, the cream is passed through line 82 to a still 71 and subjected to a steam scrubbing as heretofore described. The cream is carried by the line 83 to a flash pasteurizer 84 and treated at a temperature of 170 to 180° F., whereupon the cream is passed to the surge tank 10.

In some cases, this preliminary steam scrubbing is combined in a process using a simultaneous scrubbing as in Figures 1 and 2 and/or a subsequent steam scrubbing as in Figures 12 and 31.

A preferred form of distributor head 16 is illustrated in Figure 21. This head comprises the body portion 90 having an extension 91 within which is swaged or soldered, to provide a sealed joint, the end of pipe 15. A valve 92 is adjustably connected to the body portion 90 through the medium of bolts 93 and wing nuts 94. Sleeves 95 surround the bolts 93 and act as spacers for the valve 92. Suitable shims 96 may be interposed between the sleeves, and either the body portion or preferably the inside surface of the valve, as shown, to allow of a very fine adjustment of the outlet 41. That is to say, we employ a distributor head having means to permit of an extremely fine and critical range of adjustment for the outlet opening 41. In this connection, the outlet opening is substantially continuous or elongated and, as shown, is relatively narrow. The baffle 97 is connected to the head and supported thereby as shown, and diverts the finely divided particles downwardly in the vacuum chamber to reduce possibility of entrainment.

Referring to Figures 22 and 23, there are disclosed modified types of distributor heads which are precisely of the construction shown and described in the application of Herman C. Horneman, Serial No. 681,658. Either of these constructions may be employed as desired, but it is preferred to use the construction shown in Figure 21 and above mentioned.

Referring to Figure 22, the distributor head comprises a body 90 and valve 92 adjustably connected by bolts 93 to vary the width of the spray outlet 41. The bolts are provided with wing nuts 94 engaging springs 98 disposed between each wing nut and the adjacent surfaces of the body 90. Interiorly of the member 90 are projections 99 through which the bolts extend and which projections are of equal length and of a size whereby suitable shims 96 may be interposed between the bottom of the projections and the top surface of the valve 92, thereby affording an extremely fine and critical range of adjustment for the outlet opening 41. The valve 92 has an opening receiving the end of line 15, the end of the line being flanged and soldered to the valve as shown.

Referring to Figure 23, the distributor head 16 comprises the two members 90, 92 which are centrally connected by a single bolt 93 and arranged about the bolt are a plurality of spacer members 95 having reduced ends loosely disposed in the members 90 and 92, respectively. When it is desired to adjust the outlet opening between the body portion 90 and the valve 92 and, if required, suitable shims 96 are fitted about the reduced ends of the spacer members 95 to assure a very fine adjustment of the outlet opening 41, as described in connection with Figure 21. The line 15 is connected to the valve 92 in the same manner as in Figure 22, extending through the opening 91' in the valve.

Referring to Figures 18 and 19, the outlet 12 of the surge tank is controlled by a float actuated valve 100. The mechanism for operating this valve includes the float 101 having connected thereto an operating rod 102 pivoted on the bracket 103 carried by the wall of the surge tank, the free end of the rod 102 engaging the link 104 which, in turn, is freely connected to a lug 105 carried by the valve 100. The valve 100 is rotatably mounted on a bolt or stud 106 mounted in an extension 107 of the outlet 12 and a spring 108 is interposed between the head 109 of the stud and the inside wall of the extension 107 for maintaining the valve flush with the inside wall at all times. The rotary valve has an opening 110 which is in register with the opening in the outlet 12 when the liquid and the float are at a predetermined level. When this level is departed from, the float will act to partially or entirely close the valve until the required level is again reached in the surge tank.

The float valve structure illustrated in Figure 20 is precisely like that shown and described in the aforesaid Horneman applications and comprises a float 101 carried by a lever 102 pivoted to the wall of the surge tank 10 at 111. A lever 112 is pivotally connected to the arm 102 and to a valve 113, forming a slide operated valve mechanism, the operation of which will be readily understood, for controlling the opening and closing of the outlet 12.

In Figures 18 and 19, the float is shown at the predetermined level with the opening 110 registering with the opening in the outlet 12, while in Figure 20 the float is shown in its lowered position with the valve 113 closing the opening in the outlet 12. The purpose of employing float valves of the type illustrated in Figures 18, 19 and 20 is to overcome any possibility of releasing the vacuum in the chamber 9 if the liquid reaches a predetermined depressed level as when the cream supply temporarily stops. In some cases, the float structure may be omitted and a simple gate valve, manually or automatically operated, positioned at the outlet 12 leading to the pump.

The distributor head 16 is relatively small as compared to the size of the vacuum chamber 9, as shown. It is preferably substantially centrally located, that is, sufficiently below the outlet port 42 in the chamber 9 to prevent entrainment and far enough from the bottom of the chamber to give the falling particles projected from the head a sufficient time for adequate separation out of the vapor and liquid phase constituents and cooling of the latter. These conditions are preserved in Figures 1 and 2 as well as in the other apparatus shown.

The line A—B and/or line 15 is of a length and diameter to enable the lactic fluid to be continuously pumped to the head 16 and, as stated, during this travel the lactic fluid is simultaneously pasteurized and intimately mixed with the steam to be compressed, broken up and subdivided under the conditions created in the line A—B.

As heretofore stated, the cream introduced into the line A—B is continuously under the influence of (a) the heating effects, (b) the pumping pressure of the pump P, (c) the steam pressure impressed upon the fluid, and (d) the back pressure created by reason of the restricted outlet 41 in the distributor head 16 cooperating with said pressure components. The cream or fluid is consequently thoroughly pasteurized and subdivided to obtain a preliminary, but nevertheless very complete subdivision of the particles and the cream-steam-water mixture is brought, by means of the control provided, to optimum condition and temperature and pressure for introduction into the vacuum chamber through the distributor head. That is to say, the subsequent explosive expansion to which the steam-cream-water mixture is subjected in the vacuum chamber will result in the maximum release of volatiles and odoriferous substances. These latter will be continuously removed through the port 42 and the cream will continuously coalesce in a highly purified condition and be collected in or from the bottom of the vacuum chamber 9.

In Figures 7 and 8, we have illustrated further examples of apparatus which are precisely those shown and described in the aforesaid Horneman applications.

The constructions shown in Figures 7 and 8 comprise a vacuum chamber 9 and surge tank 10 to which fluid is supplied through a pipe 11 as described in connection with Figures 1 and 2. The surge tank 10 has a laterally extending outlet 12 as shown in Figures 18, 19 and 20, and the liquid is transferred through the pipes 120, 121 to the vacuum chamber 9, flow in the direction of the vacuum chamber being created by reason of the pressure differential being maintained between the liquid in the line 120, 121 and the vacuum chamber 9. A steam line 122 has its open or nozzle end introduced in the line 120 above the outlet 12 and steam is introduced under pressure and in sufficient quantity to heat the liquid in the line 120, 121 to a pasteurizing or sterilizing temperature; which temperature and pressure are automatically maintained by a thermostat control 123 activated from the bulb at 124. The cream-water-steam mixture from line 120, 121 is distributed in vacuum chamber 9 by a distributing head 16 similar to those already described and shown in detail in Figures 21, 22 and 23, through the narrow, preferably elongated or continuous peripheral opening 41. In Figure 8, the vapors and gases released by the introduction of the liquid-steam-water mixture into the vacuum chamber 9 through the head 16 are carried off through the port 42 and pipe 43 to the condenser 44 and pump 48 as shown also in Figures 1, 2, 5 and 9. In the apparatus of Figure 7, a plurality of spaced outlet ports 42 as shown in detail in Figure 10 are employed, and an ejector-condenser system indicated as a whole at 125 is utilized instead of a wet pump 48.

Either an ejector-condenser system 125 or a wet pump and condenser 48, 44 are employed with each of the vacuum chambers or vacuum-chamber-stills shown and described herein, and this is likewise true of the suction outlet means shown in Figure 10.

Referring to Figures 7 and 8, the present differential between the line 120, 121 and the vacuum chamber 9 and the relatively narrow outlet opening 41 in the head causes a spontaneous and violent separation of the mixture in the vacuum chamber. That is, the liquid and vapor phases are discharged through the narrow elongated outlet 41 and are broken up or particulated into substantially a fog from which the cream or milk on the one hand and the water vapor and gases on the other separate out in the chamber 9 as with the process shown in Figures 6 and 2.

The vacuum chamber 9 is provided with a heating jacket 65 similar to that described in connection with Figure 2, which serves to reduce to a minimum the possibility of condensation of water vapors and gases on the wall of the vacuum chamber as well as produces a prolonged separation of vapors and odoriferous gases from the liquid phase particles.

The liquid portions of the cream or milk will coalesce and collect at the bottom of vacuum chamber 9 and will pass by outlet 49 through a cooler system 73 and can be continuously removed and recovered from the vacuum chamber by means of line 59 and a suitable pump 50 and discharged through pipe 70.

In some cases, the apparatus of Figures 7 and 8 will be associated with a preliminary distillation as described and shown diagrammatically in Figure 32 for continuously pre-treating the lactic fluid before its introduction to the surge tank 10, all as heretofore described. In other cases, the cooler will be disconnected and the cream from the vacuum tank 9 will be continuously pumped through the line to the still 71 all as shown and heretofore described in connection with Figure 31. Of course, both a preliminary treatment as shown in Figure 32 and a subsequent distillation treatment as shown in Figure 31 will be used if desired.

The line 120, 121 in some cases will be made similar to the line A—B described in connection with Figures 1, 2, 5, 6 and 12, in which event, the pipe 120 will be elongated to receive the steam injectors C or D and associated with a pump P and a thermostat 40 if required, as heretofore described.

In Figure 9, we have illustrated a further construction which is precisely like that shown and described in the aforesaid Horneman applications wherein one or more peripherally disposed spray nozzles 126 are provided. These nozzles 126 are preferably spaced apart and the jet openings are constructed to project the mixture toward the center of the chamber and slightly downwardly, to facilitate the downward fall of the liquid phase of the cream-steam-water mixture. These nozzles are of any suitable design such as commonly used for production of powdered dairy products by a spray process. The nozzles, as shown in detail in Figure 24, each have a spirally grooved and loosely confined member in advance of the outlet port and will produce the so-called solid cone spray.

The construction shown in Figures 9 and 24 can be embodied in each of the other apparatus illustrated in Figures 1 to 12 and Figures 25 to 29, as desired, and such apparatus will be equally operable with either a construction embodying the line 120, 121, as shown in Figure 9, or a pump P and line A—B with injector device C or D. The apparatus shown in Figure 9 is capable of being operated as a continuous system in association with the scrubbing apparatus described in connection with Figures 1, 2, 12, 30, 31 and 32.

In Figures 25 to 28, inclusive, we have illustrated various forms of vacuum chambers, particularly modifications of a heated vacuum chamber. In Figure 25, the vacuum chamber is heated by a coil 127, disposed below the distributor head; in Figure 22 the coil 127 surrounds the distributor head; and in Figure 27, the heating coil is disposed above the head. Any of the three dispositions of the coils may be used or combined in any suitable manner with the vacuum chambers or vacuum-chamber-stills herein described.

Instead of using a circulating medium such as hot water or a gas, the coil may be provided with an electrical resistance element as shown in Figure 28 or the jacket 65 may be provided with an electrical heating unit as shown in Figure 29.

In Figure 11, we have illustrated a means of supply as a heated circulating medium such as hot water to the jacket 65 of the vacuum chamber 9 or to the coil 127. The warm water from the condenser shown in this system or that shown in Figure 5 is pumped through the line 128 in any suitable manner and a steam ejector 129 is employed to raise the temperature of the water, as desired. The ejector 129 is controlled by a suitable thermostat 130 to regulate this heating of the water and assure that it will be delivered to the jacket or coil at a constant required temperature.

With each of the processes and apparatus heretofore described, the fluid such as cream is pasteurized and subdivided in the line A—B or the line 120, 121 preliminary to its introduction into the vacuum chamber 9. The diameter of the line A—B or the line 120, 121, the peripheral dimension of the members defining the outlet in the head 16, the size of the outlet, the diameter of the steam inlet, the temperature and pressure of the steam, and the pumping pressure are selected or controlled to produce the required result. In other words, these parts should be so related that the proper pressure differential will be established and that sufficient time will be permitted before the mixture enters the chamber (1) for intimate mixing of the steam and lactic fluid, and fine subdivision of the latter, and (2) for reaching a temperature sufficient for pasteurization or sterilization.

The invention is applicable to milk, cream, ice cream mix and milk products in general and for convenience, we shall describe the treatment of sour cream (any cream in which the titratable acidity calculated as lactic acid exceeds 0.20%) to improve the same and render it satisfactory for the manufacture of butter.

Conventional practice comprises reduction of the acidity of the sour cream to a point at which satisfactory churning may be accomplished. Normally this point lies within a range from .18 and .25 calculated as lactic acid. Upon completion of the acid reduction, the practice is to pasteurize in any suitable manner. The neutralizing and pasteurizing steps exert some flavor improving effects due to the volatilization of certain flavors.

In the processes now to be described, we will assume, as in ordinary cases, that the sour cream is collected in a suitable vat with means for mixing and sampling and possesses various percentages of acidity.

Process A

In carrying out the preferred process, the apparatus illustrated in Figures 1, 2, 13 and 14 is employed.

Initially, and referring to Figure 30, the cream as received is warmed to a point where it can be conveniently handled with the usual dairy equipment. Normally, this temperature will not exceed 100° F., preferably 90 to 100° F. Thereafter, the acidity is reduced, if necessary, by a neutralizing treatment as understood in dairy practice. The acidity of the sour cream is adjusted and after a suitable time has been allowed for the action of the neutralizing agent, the cream is then quickly heated to a temperature of 150 to 165° F. and preferably not to exceed 170° F. in a conventional heater or preheating vat 131. The cream at this temperature is usually passed through a filter and transferred to the surge tank 10 through pipe 11. When proper level in the tank 10 is attained, the float will open the valve 100 and the pump P is started whereby the liquid is removed from the surge tank and pumped to the injector device C.

The cream is pumped to the injector device C and there takes place a compression of the cream in the line between the pump on the one hand and the cream outlet 21 of the injector device on the other, and a heating of the cream by contact with the wall of steam chamber 22. Thereafter, the cream of substantially 170° F. and steam of approximately 80 to 110 pounds gauge pressure (i. e., 325 to 340° F.) are discharged as high velocity intersecting streams or cones. Concomitantly, the cream-steam-water mixture enters and travels through the tapering enlarged portion 32 of the venturi so that an expansion of the mixture takes place by reason of the high velocity and attendant reduced pressure prevailing in the zone defined by the enlarged portion 32. The cream-steam-water mixture then fills the line A—B as a solid column and is again compressed which condition is maintained until discharged through the distributor head 16 when spontaneous expansion results due to the vacuum maintained in vacuum chamber 9. It will be understood that the heating, compression, bombardment and mixing, expansion, and compression just described results in a very fine subdivision of the cream whereby undesirable substances are released or rendered potentially releasable.

Line A—B, it will be observed, is relatively long and this length of treatment of the travelling cream-steam-water mixture under compression with the cream in contact with the injected steam, assures a complete pasteurization or sterilization, as well as a breaking up of the cream particles to a finer state of subdivision. At the same time, by reason of the provision of the pump P, the capacity of the apparatus is substantially increased.

The cream-steam-water mixture in the line A—B is agitated and compressed and is maintained in a state such that the released volatiles do not again permanently combine with the cream and at the same time additional undesirable substances are released or rendered potentially releasable. The compression in the line A—B is the resultant of the steam pressure, the pumping pressure, and the back pressure built up by the cooperation of the restricted outlet 41 of the head 16 with the steam and pumping pressures.

In line A—B, under the conditions of compression set forth above, the latent heat of the steam is very largely transferred to the cream and (1) part of the steam condenses and (a) the heat of condensation also is transferred to the cream resulting in a cream-steam-water mixture having a pasteurizing or sterilizing temperature of substantially 200 to 250° F., or higher, in the case of the process and apparatus described in connection with Figures 1 and 2, (b) the condensation of the steam with sudden collapse of the steam bubbles upon coming in contact with relatively cooler cream will cause a breaking up of the fat globules with consequent release of volatile odoriferous substances occluded within the fat globules, and (c) the heating effect, the release of volatiles and the uncondensed portion of the steam produces a compression, i. e., a building up of pressure in the line A—B, and (2) the uncondensed steam exerts a sweeping action in that it serves as a carrier for the volatile or vapor phase constituents of the cream released by the shattering actions and heating effect of the steam.

By reason of the intimate mixing provided in the enlarged portion 32 of the injector device C and the compression which takes place in the line A—B, live steam may be successfully employed, for heating the mixture to a temperature within the sterilizing range of 200 to 250° F. or higher. Thus, pasteurization and sterilization is initiated in the Venturi device C and is completed as the cream travels through the line A—B to the distributor head 16.

The reduced pressure in the vacuum chamber 9 will be substantially twenty-four to twenty-eight inches, preferably twenty-four to twenty-six inches, and a pressure differential, of course, may be regulated as desired.

Referring to Figure 1, the cream-steam-water mixture is discharged from the distributor head 16 and by reason of the pressure differential, the restricted outlet 41 and the reduced pressure in the vacuum chamber 9 is subjected to violent and explosive expansion and assumes the form of a fog or mist. The vapor phase constituents of this fog or mist are withdrawn through the outlet 42 while the liquid phase or cream particles coalesce and are collected by the receiving member of pan 51 or the baffle 52 from which they are continuously discharged to one of the end compartments 55 of the vacuum chamber 9. The scrubbing means 57 is now operated, i. e., simultaneously and continuously with the introduction of the mixture into the vacuum chamber and its expansion to a fog or mist-like state, and the cream collecting in the compartment is given a thorough scrubbing with live steam under pressure, e. g., 80 pounds gauge pressure, whereby objectionable substances remaining in the cream are volatilized and particularly, mechanically swept out of the cream. This is very effective, since by reason of the previous treatments in the injector device C and the line A—B and the subsequent expansion treatment in the vacuum chamber 9, any remaining odoriferous or flavor imparting substances have been conditioned to a high state of potential releasability and are therefore volatilized and swept out by the steam scrubbing action. The cream reaches a level in the end compartment 55 and then continuously flows through each of the other compartments 55, successive portions thereby being given a simultaneous steam scrubbing treatment in the manner just described. The substances released by the steam scrubbing, as well as those separated by the expansion treatment, are carried off through the outlet 42 and the treated cream is removed from the other end compartment 55 through a suitable outlet pipe 49 and cooled or otherwise treated.

It will be observed that there takes place a simultaneous and continuous expansion of the cream-steam-water mixture into substantially a fog or mist and treatment of the coalesced cream by a steam scrubbing action under vacuum, both operations taking place in the same vacuum chamber. Stated another way, the expansion treatment in chamber 9 continues and the liquid phase particles produced thereby are continuously collected and successive portions, while in continuous flow, are subjected to a steam scrubbing action in the chamber 9.

In each of the compartments 55, in which successive portions of the cream are continuously steam scrubbed, the steam device 57 produces an agitation and turbulence of the particular cream portion which also assists in the removal of the undesired substances.

The cream undergoes no substantial concentration or dilution by reason of the process above described, and is recovered in substantially its original volume. In this connection, of course, it will be appreciated that usually the concentration of odoriferous and off-flavor imparting substances in cream is in very small percentage, e. g., expressible as fractional parts per million.

The operation in the vacuum chamber 9 is carried out in the presence of a heating means, namely, the steam injectors 57 and the heating jacket 65 and/or the coils shown in Figures 25 to 29. Condensation of vapor phase particles on the wall of the chamber is prevented and the separation of liquid and vapor phase constituents is prolonged. This is important in that condensation of the vapor phase constituents and the consequent return of odoriferous and off-flavor imparting volatiles to the cream is effectively prevented.

The bombarding of intersecting streams of steam and preheated cream produces a shattering of the cream particles, i. e., they are torn apart and at the same time, the steam and cream are mixed and pasteurization or sterilization of the cream is completed or initiated and completed in line A—B. By using a venturi or other means including a reduced pressure zone, the cream-steam-water mixture is caused to assume a mist-like form with resultant enhanced subdivision of the cream particles and mixing of the cream and steam, affording increased release or potential release of the objectionable odor or off-flavor imparting substances. The expanded mixture fills the line A—B and during this latter treatment is compressed and agitated and the cream is uniformly heated to and held at a pasteurization or sterilization temperature. The mixture is rapidly cooled in the vacuum chamber as heretofore described, being spontaneously expanded therein to a mist or fog-like state from which the vapors and undesirable volatiles are recovered and the cream in purified condition collected.

In connection with the use of steam in any of the processes described herein, it will be observed that other inert gases may be employed. Steam is most convenient and economical and it will be used in such quantities and pressures as to raise the temperature of the mixture to the desired temperatures, namely 200 to 250° F. and is injected in a manner to compress the mixture while directing it toward the vacuum chamber and at the same time producing, mixing and agitation of the steam-cream-water mixture to assure uniform heating and very intimate subdivision of the cream particles and clumps.

As heretofore described, the cream is heated (1) in the steam line A—B by the steam and (2) in the vacuum chamber by the heated wall thereof or the surface of a heated coil, and, in each case, while under the influence of the vacuum. That is, the compressed mixture in the line A—B is under the directional influence of the vacuum in cooperation with pressure and velocity of the mixture in the line. Of course, in the vacuum chamber the fluid is under a direct expansive influence. The operation is continuous without hardening of the curd or curd constituents and the heating of the chamber 9 assures maximum constant separation and removal of volatiles including condensed steam.

*Process B*

Process B is precisely like Process A except that the injection device D is employed instead of the injector device C. With this injector device D, the cream travelling in the line A—B is subjected to a multiplicity of spaced jets acting to bombard the cream and produce a turbulent agitation thereof. Stated precisely, the flowing column of cream is subjected to a multiplicity of impacts from the steam jets, assuring intimate mixing and subdivision of the cream by the combing action.

The cream-steam-water mixture produced is compressed by reason of the heating effects, the pumping pressure, the steam pressure, and the back pressure, and the cream undergoes pasteurization or sterilization while traveling through the line. We have shown the injector device as comprising nozzles having a multiplicity of spaced steam ports; in some cases, either the lower or upper injector nozzle will be sufficient but both are preferred. Again the nozzles or a single nozzle, extending throughout the length of the line A and/or B, are employed.

The action of the injector D in cooperation with the line A—B whereby the cream is bombarded by a multiplicity of jets or impacts, results in agitation of the cream and the cream-steam-water mixture and a very fine subdivision of the cream particles, releasing and rendering potentially releasable a substantial portion of the undesirable substances.

In the case where an injector device D is used, and referring to Figure 1, as soon as flow is established, steam at a temperature for example of 325 to 340° F. and eighty pounds to one hundred pounds pressure, is introduced into the cream in the line A which has a temperature about 170° F. through the nozzles 35, shown in Figures 15 and 16.

In the line A—B, the steam injection will be such as to produce a turbulence and whirling, i. e., agitation of steam and cream in the traveling fluid assuring a uniform heating and pasteurizing and intimate mixing of the steam and cream. The steam pressure and the heating effects of the steam will augment the pumping pressure and the head of pressure created by the pump and distributor head so that the cream particles are very effectively heated and subdivided.

The cream-steam-water mixture formed is discharged through the distributor head 16 in the manner already described and subjected to the expansion and steam scrubbing treatment as described in connection with Process A.

Referring to Figure 5, and to Figures 15 and 16, if the cream in the line A, when it reaches the upper nozzle, has a temperature of about 190 to 205° F., this temperature is raised through the provision of the upper steam nozzle to substantially 210 to 230° F. and the pressure of the cream-steam-water mixture in the line A—B will show a gauge pressure of ten to fifteen pounds.

We find these conditions to be ideal for certain types of cream where a vacuum of twenty-four to twenty-six inches is maintained in the vacuum chamber and the distributor head opening 41 is properly adjusted. In addition to control means in the steam line, an additional control means 40 (not required where injection device C is used) is associated with the line A—B so that the pressure and temperature of the steam-cream-water mixture introduced to pipe 15 may be further regulated.

The pasteurizing or practical sterilizing of the cream and its intermixing with the steam, as well as the breaking up of the fat globules with release of volatiles, takes place during the continuous passage of the mixture from the surge tank and steam outlet to the distributor head 16 and (1) under the influence of the steam pressure and the resultant compression effects of the steam and (2) the pumping pressure and steam pressure in cooperation with the restricted opening in the distributor head.

Process C

In Process C either the injector device C or the injector device D are employed with any of the apparatus illustrated in Figures 5 to 12, inclusive, and 25 to 29, inclusive, and the process is substantially as described above.

Referring to Figures 5 and 6 by way of example, the coalesced cream is continuously collected in the bottom of the vacuum chamber and continuously pumped by means of the pump 50 to a suitable steam scrubbing vacuum apparatus 71 and treated continuously therein, as illustrated diagrammatically in Figure 31. Again, the cream may be allowed to collect in the vacuum chamber 9 until a desired quantity or batch results and thereafter passed to the scrubbing instrumentality 71 and the batch scrubbed as a batch or continuously until exhausted from the chamber 9. In other words, the scrubbing treatment may take place in a separate chamber and be either continuous with the expansion treatment in vacuum chamber 9 or intermittent, i. e., operated as a batch process in the same chamber 9 or in a separate vacuum scrubbing chamber.

Process D

Referring to Figure 12, a multiplicity of combined vacuum chambers and steam scrubbing apparatus are employed which are similar to apparatus of Figures 1 and 2, with or without a compartment structure. That is to say, each vacuum chamber will be provided with a distributor head 16 and suitable steam injector means 57. The line A—B is connected selectively to a battery or plurality of such vacuum-steam scrubbing apparatus, and expansion will be carried out in one or more of the chambers and the cream collected therein as a batch while in other of the chambers, the batch will be undergoing a steam scrubbing action.

This batch treatment may be employed using but a single still of the type shown in Figures 1, 2 and 12, i. e., with or without a compartment structure, the vacuum chamber comprising essentially a distributor head 16 and a steam scrubbing means 57. This process is otherwise substantially as described above.

Process E

Referring to Figure 32, we have illustrated diagrammatically a process wherein the cream is given an initial scrubbing. As stated, this is not preferred but in some cases may be resorted to. Likewise, in some cases, both a preliminary scrubbing and a simultaneous or continuous or subsequent steam scrubbing may be employed, as herein described. The process is otherwise as described above.

Process F

While we have referred herein to a scrubbing treatment either prior to, simultaneous or continuous with, or subsequent to the expansion treatment, it is to be understood that in some cases this scrubbing will not be required. The advantage of the steam scrubbing resides in the very satisfactory removal of objectionable substances from the cream, particularly where such off-flavor and odoriferous substances are present in excessive concentration and/or of a tenacious character. It will be appreciated, therefore that the steam scrubbing treatment will in some instances be omitted but as stated is preferred.

In other respects the process is similar to those already described.

Process G

This process is distinguished from the other processes in that there is no initial reduction of acidity in the case of sour cream. That is, in this process the pasteurized deodorized cream is neutralized, if necessary, after discharge from the outlet 49 or the pump 50. In the event that the cream under treatment has an initial and appreciable acidity, its pasteurization and deodorization is accomplished without recourse to an initial neutralization or acid reduction and without detrimental curd formations, due to the breaking up of the cream in the line A—B and the chamber 9 as described.

We have found that it is possible to pasteurize the sour cream, and by this process, in some cases, a better pasteurization is obtained.

In Figure 30, we have illustrated diagrammatically the operation and treatment of the cream in accordance with any of the processes described and using any of the apparatus of Figures 1 to 12 and 25 to 29, that is, a single vacuum-chamber-scrubber as shown in Figures 1, 2 and 12, or a separate vacuum scrubber chamber as in Figures 12, 31 and 32. It will be understood that either type of injection device C or D may be utilized, or a simple steam injection device as described in said Horneman applications, as well as the processing illustrated by Figures 31 or 32 or both.

In some cases, with any of the processes and apparatus, steam injector device C or D will be employed to treat the cream before it reaches the surge tank, and thereafter steam injector device D or C will be interposed in the line so that the cream will be given a combination of these treatments. Of course, the same type of injector device may be used for each treatment, i. e., preliminary and subsequent.

In any of the processes described, on one side of the distributor head within the vacuum chamber, there is maintained a condition of reduced pressure, preferably 24 to 26 inches and up to 28 inches or more of vacuum while, on the other side of the head, i. e., in the line A—B—15, is present a cream-water-steam mixture under a pressure, where the vacuum is twenty-four to twenty-six inches, of substantially five to six pounds gauge and at a temperature of up to 250° F. and higher. The pressure differential between the line A—B and the vacuum chamber under these conditions is substantially two atmospheres. This pressure differential will, of course, vary with the conditions of operation as outlined above and may, in some instances, be greater or less than two atmospheres.

By reason of the pressure and the compression on the cream in the line A—B—15 created by the pump and distributor head and the steam with its resultant heating and compression effects, and the reduced pressure in the vacuum chamber, the cream-steam-water mixture is ejected into the vacuum chamber with violent and spontaneous expansion. A fog of finely divided cream and water vapors and gases is thereby produced. The finely divided cream particles of the fog gradually coalesce and are treated or collected as described. The relative fineness and division of the cream particles and consequent effective deodorization and removal of off-flavor imparting substances and rapidity of cooling is greatly enhanced by the use of a distributor head having a continuous elongated or peripheral and narrow opening 41 in cooperation with the line A—B in which the fluid is subjected to turbulence and whirling and agitation while under the pressure effects heretofore described. The sudden release of the cream at a pasteurizing or sterilizing temperature into the vacuum chamber with instantaneous cooling to the boiling point of the liquid, which point normally approximates 130 to 145° F., is instrumental in preventing at the prevailing pressure formation of grainy texture or a weak body in any resulting butter or manufactured milk product.

By reason of the use of a distributor head and a spontaneous and violent ejection of the water-cream-steam mixture due to the pressure differential, we greatly reduce foaming and consequent cream loss through entrainment.

The inclined walls of the opening 41 and associated baffle act to deflect the fog downwardly so as to diminish the possibility of entrainment of the cream particles with the vapors and gases withdrawn through the outlet in the vacuum chamber. The area of the baffle is such that it will effectively deflect the major portion of the fog without, however, restricting the net free area between the outside periphery of the baffle and the internal wall surface of the chamber to such a point that the evaporation velocity of the vapors does not attain a critical velocity of entrainment, e. g., twenty feet per second for water vapor.

The chamber 9, as stated, is heated by means of a jacket or coil through the use of a circulating medium or electrically, and the inner exposed wall of the chamber is maintained substantially constant and at the temperature corresponding to the boiling point of the cream under the conditions of vacuum being maintained and preferably slightly higher, e. g., with a vacuum of twenty-four to twenty-six inches, the water circulating in the jacket is maintained at substantially twenty degrees above the temperature in the chamber, namely, at about 165° F. We find that by using a heated chamber under the conditions of temperature any vacuum set forth above, the deodorizing and off-flavor removing effect is increased because of the fact that we can completely prevent any condensation of vapors or gases on the wall of the chamber and consequent return of separated odoriferous substances to the collected cream in the bottom of the chamber. By maintaining this increased temperature on the wall, we also prolong the evolution of the steam or evaporation from, as well as consequent deodorization of, the cream particles as they coalesce and gravitate. These results are likewise attained when a heating coil is disposed within the chamber 9 as illustrated in Figures 24 to 29, inclusive.

It will therefore be seen that the initially warmed cream is intimately mixed with steam and subjected in the line A—B to a compression and, at the same time, is given a turbulence and whirling or agitation whereby there simultaneously takes place a pasteurization or sterilization and a breaking up or subdivision of the fat particles and clumps with resultant release of odoriferous volatile matter. The steam and vapors act as a carrier for such evolved gases. As stated, the resulting mixture is compressed and a pressure differential is set up between the reduced pressure maintained in the evacuated chamber and the cream-steam-water mixture in the line. By reason of the narrow and elongated opening in the head and the pressure differential, the mixture is discharged with spontaneous and violent expansion into the heated vacuum chamber in extremely finely divided condition. The head is usually positioned with respect to the chamber whereby there is sufficient time for the separation of the liquid and vapor phases, so that (1) the cream will coalesce and gravitate without entraining vapors or odoriferous gases and (2) the vapors and gases do not entrain the cream and also they are prevented from condensing by the heated chamber.

The preliminary heating in the line A—B affords a rapid heating, i. e., pasteurization or sterilization of the travelling fluid, and the substantially spontaneous and violent release of the mixture with creation of a fog produces (1) a rapid cooling of the liquid phase as will be understood, because of withdrawal of heat by evaporation in the vacuum chamber, and (2) the carrier water vapors and gases carrying odoriferous and off-flavor substances previously released in the line A—B continue to have this function in the chamber and are the vehicle by which the objectionable substances are carried from the chamber to the condenser system. In this manner, deodorization and removal of off-flavor imparting substances is accomplished effectively and an improved cream is collected at the bottom of the chamber. Re-contamination is prevented since the chamber is heated and thus condensation on the wall is prevented, as well as prolonged evaporation of water and evolution of gases from the cream particles assured. This provision of a heated chamber is an essential feature of the present invention.

The cream is recovered in pasteurized condition, greatly improved as regards flavor and odor, and is of excellent quality for manufacture of dairy products. The treatment described does not impart any detrimental properties to the cream, which in any way affects its suitability for butter making, as evidenced by the fact that there are no increased butterfat losses in the buttermilk or any undesirable body characteristics imparted to the resulting butter.

It is to be understood that various combinations of the apparatus are employed, e. g., the pump P is used with any one of the forms of injector devices shown and described, and in combination with any one of the forms of vacuum chambers or vacuum-chamber-scrubbers; likewise the injector devices, one or both, are used with any one of the vacuum chambers or vacuum-chamber-scrubbers or combination thereof.

As stated above, the steam sweeping operation is a heating operation, in that the temperature of the cream is maintained constant in accordance with the degree of vacuum in the chamber and the cream does not suffer any substantial cooling below that which results from its introduction into the vacuum chamber, i. e., there is no appreciable decrease in temperature on account of evaporation. This steam sweeping, moreover, serves the purpose of maintaining temperature of the metal wall of vacuum chamber adjacent to the coalesced liquid constant, thereby preventing any objectionable condensation of the steam.

Various modifications and changes can be made in the invention, all of which are considered to be comprehended within the scope of the appended claims.

This application is a division of our copending application Serial No. 13,168, filed March 26, 1935.

We claim:

1. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog and steam scrubbing the liquid phase constituents in the presence of the fog to remove remaining odoriferous substances.

2. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and continuously steam scrubbing the liquid phase constituents in the presence of the fog to remove odoriferous substances.

3. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and subjecting successive portions of the liquid phase constituents to a scrubbing with steam for removing remaining odoriferous substances.

4. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and subjecting successive portions of the liquid phase constituents to a scrubbing with steam for removing remaining odoriferous substances in the presence of a reduced pressure.

5. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and continuously subjecting the liquid phase constituents as a moving mass to a scrubbing with steam.

6. The process of pasteurizing and deodorizing lactic fluids comprising mixing steam in a multiplicity of jets and at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and subjecting the liquid phase constituents to a steam scrubbing action for removing remaining odoriferous substances.

7. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and scrubbing the liquid phase constituents with steam to remove remaining odoriferous substances.

8. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and steam scrubbing the liquid phase constituents at reduced pressure to remove remaining odoriferous substances.

9. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure in a vacuum chamber such as to produce expansion of the mixture to substantially a fog-like state, separating and collecting the liquid and vapor phase constituents of the fog, and steam scrubbing the separated liquid phase constituents at reduced pressure in the same vacuum chamber to remove remaining odoriferous substances.

10. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and scrubbing the collected liquid phase constituents at reduced pressure to remove remaining odoriferous substances by passing steam through the liquid phase at a velocity sufficient to sweep through the same and to withdraw the odoriferous substances while maintaining the temperature of the liquid phase at substantially its boiling point under the prevailing conditions of reduced pressure.

11. The process of pasteurizing and deodorizing lactic fluids comprising mixing steam at sufficient temperature and pressure with a confined traveling fluid mass so as to pasteurize the same and compress the mixture and subdivide the fluid, subjecting the mixture so treated to a condition of reduced pressure in a vacuum chamber such as to produce expansion of the mixture to substantially a fog-like state, separating and collecting the liquid and vapor phase constituents of the fog, and scrubbing the liquid phase constituents at reduced pressure in the same vacuum chamber to remove remaining odoriferous substances by passing steam through the collected liquid phase at a velocity sufficient to sweep through the same and to withdraw the odoriferous substances while maintaining the temperature of the liquid phase at substantially its boiling point under the prevailing conditions of reduced pressure.

12. The process of pasteurizing and deodorizing lactic fluids comprising mixing steam at sufficient temperature and pressure with a confined travelling fluid mass so as to pasteurize the same and compress the mixture and subdivide the fluid, subjecting the mixture so treated to a condition of reduced pressure such as to produce expansion of the mixture to substantially a fog-like state, separating and collecting the liquid and vapor phase constituents of the fog, and continuously scrubbing the collected liquid phase constituents at reduced pressure to remove remaining odoriferous substances by passing steam through the liquid phase at a velocity sufficient to sweep through the same and to withdraw the odoriferous substances while maintaining the temperature of the liquid phase at substantially its boiling point under the prevailing conditions of reduced pressure.

13. The process of pasteurizing and deodorizing lactic fluids comprising mixing steam at sufficient temperature and pressure with a confined travelling fluid mass so as to pasteurize the same and compress the mixture and subdivide the fluid, said mixing being accomplished by bombarding a high velocity stream of the fluid with a high velocity stream of steam at a restricted portion in the flow formed as a venturi, subjecting the mixture so treated to a condition of reduced pressure such as to produce expansion of the mixture to substantially a fog-like state, and separating and collecting the liquid and vapor phase constituents of the fog.

14. The process of pasteurizing and deodorizing lactic fluids comprising mixing steam at sufficient temperature and pressure with a confined travelling fluid mass so as to pasteurize the same and compress the mixture and subdivide the fluid, said mixing being accomplished by bombarding a high velocity stream of the fluid with a high velocity stream of steam at a restricted portion in the flow formed as a venturi, subjecting the mixture so treated to a condition of reduced pressure such as to produce expansion of the mixture to substantially a fog-like state, separating and collecting the liquid and vapor phase constituents of the fog, and scrubbing the liquid phase constituents with steam to remove remaining odoriferous substances.

15. The process of pasteurizing and deodorizing lactic fluids comprising mixing steam at sufficient temperature and pressure with a confined travelling fluid mass so as to heat the mixture to substantially 200 to 250° F. to pasteurize the fluid and compress the mixture and subdivide the fluid, said mixing being accomplished by bombarding a high velocity stream of the fluid with a high velocity stream of steam at a restricted portion in the flow formed as a venturi, subjecting the mixture so treated to a condition of reduced pressure such as to produce expansion of the mixture to substantially a fog-like state, and separating and collecting the liquid and vapor phase constituents of the fog.

BERNARD W. HAMMER.
HERMAN C. HORNEMAN.
MILTON E. PARKER.